(12) United States Patent
Tanner

(10) Patent No.: US 11,856,205 B2
(45) Date of Patent: Dec. 26, 2023

(54) SUBJECTIVE VISUAL QUALITY ENHANCEMENT FOR HIGH SPATIAL AND TEMPORAL COMPLEXITY VIDEO ENCODE

(71) Applicant: Intel Corporation, Santa Clara, CA (US)

(72) Inventor: Jason Tanner, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 886 days.

(21) Appl. No.: 16/692,516

(22) Filed: Nov. 22, 2019

(65) Prior Publication Data

US 2020/0099933 A1    Mar. 26, 2020

(51) Int. Cl.
*H04N 19/147* (2014.01)
*H04N 19/176* (2014.01)
*H04N 19/14* (2014.01)
*H04N 19/103* (2014.01)
*H04N 19/122* (2014.01)

(52) U.S. Cl.
CPC ......... *H04N 19/147* (2014.11); *H04N 19/103* (2014.11); *H04N 19/122* (2014.11); *H04N 19/14* (2014.11); *H04N 19/176* (2014.11)

(58) Field of Classification Search
CPC .... H04N 19/176; H04N 19/105; H04N 19/52; H04N 19/61; H04N 19/70; H04N 19/46; H04N 19/11; H04N 19/147; H04N 19/117; H04N 19/82; H04N 19/132; H04N 19/136; H04N 19/103; H04N 19/157
See application file for complete search history.

(56) References Cited

U.S. PATENT DOCUMENTS

2011/0103473 A1\* 5/2011 Li .......................... H04N 19/19
375/240.12

\* cited by examiner

*Primary Examiner* — Farhan Mahmud
(74) *Attorney, Agent, or Firm* — Essential Patents Group, LLP

(57) ABSTRACT

Techniques related to improved visual quality for high spatial and temporal complexity video encoding are discussed. Such techniques include ranking candidate coding structures based on rate distortion values generated using a first distortion measurement technique, detecting candidate coding structures with large coding unit and transform sizes, and disabling detected candidate coding structures with a distortion, generated using a second distortion measurement technique, that meets or exceeds a threshold.

20 Claims, 8 Drawing Sheets

SUBJECTIVE VISUAL QUALITY ENHANCEMENT FOR HIGH SPATIAL AND TEMPORAL COMPLEXITY VIDEO ENCODE

BACKGROUND

In video compression/decompression (codec) systems, compression efficiency and video quality are important performance criteria. For example, visual quality is an important aspect of the user experience in many video applications and compression efficiency impacts the amount of memory storage needed to store video files and/or the amount of bandwidth needed to transmit and/or stream video content. A video encoder compresses video information so that more information can be sent over a given bandwidth or stored in a given memory space or the like. The compressed signal or data is then decoded by a decoder that decodes or decompresses the signal or data for display to a user. In most implementations, higher visual quality with greater compression is desirable.

In some contexts, video content includes high temporal and spatial complexity. Such temporal and spatial complexity can produce obvious visual artifacts in the decoded video, particularly at high quantization parameter (QP) values. There is an ongoing concern with improving subjective video quality in video codec systems. It is with respect to these and other considerations that the present improvements have been needed. Such improvements may become critical as the desire to compress and transmit video data becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
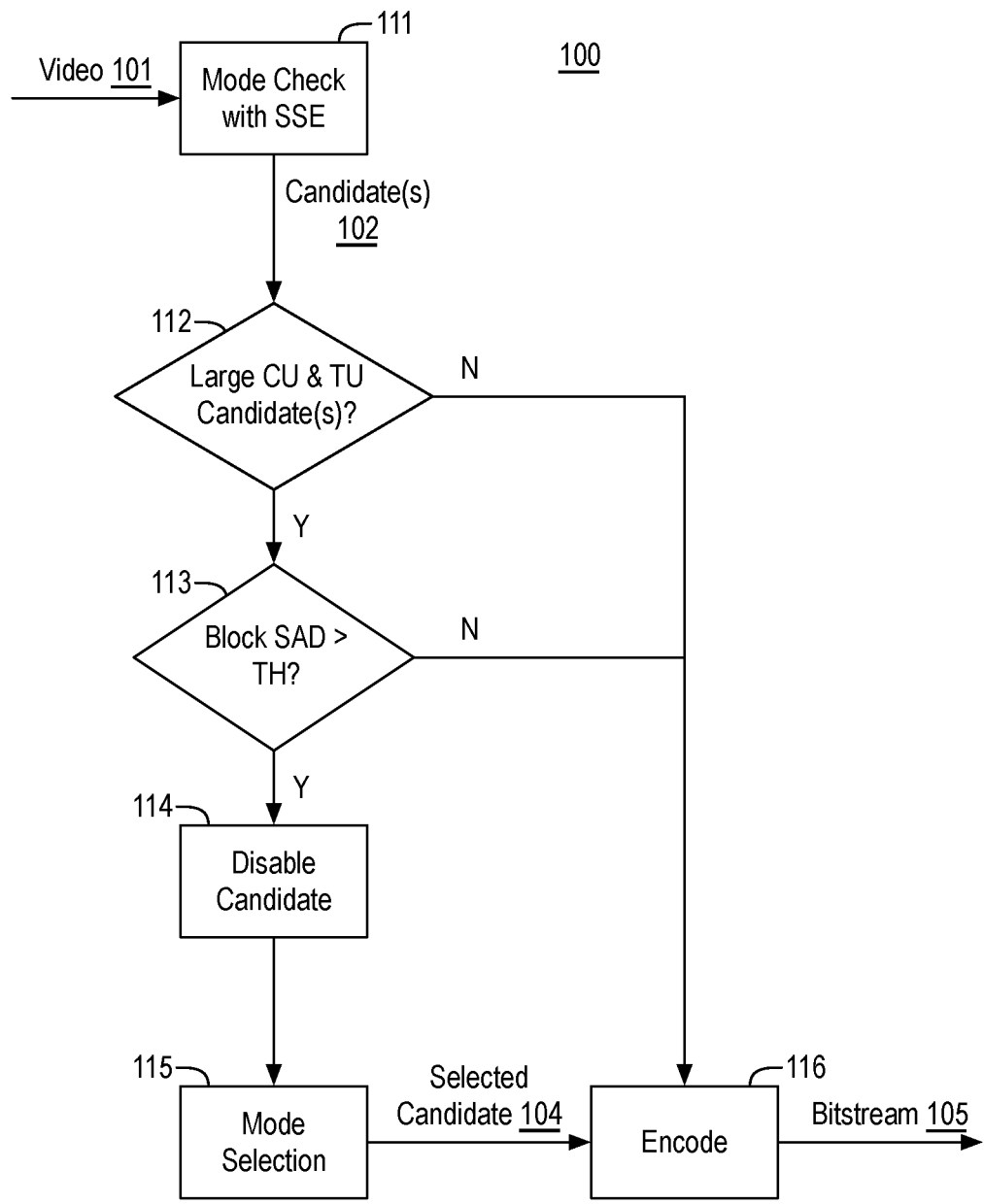
FIG. 1 is an illustrative diagram of an example system for coding video to a bitstream.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Methods, devices, apparatuses, computing platforms, and articles are described herein related to video coding and, in particular, to improving subjective visual quality in high spatial and temporal complexity video.

As described above, it may be advantageous to improve subjective video quality in high spatial and temporal complexity video. Notably, when spatial and temporal complexity of video are high, all encoding modes (inter/intra with different coding unit sizes) may be a poor fit due to the spatial and temporal complexity. As a result, a typical encoder may select, for a largest coding unit, such as a coding tree unit (CTU), large coding unit (CU) sizes (or block sizes) with either intra and/or inter modes and a large transform unit (TU) size for the coding units. Using such selections, which are based on minimizing a rate distortion metric using a distortion measure such as sum of squared errors (SSE), can produce obvious visual artifacts, particularly at high quantization parameter (QP) values. As discussed herein, in some embodiments, high spatial and temporal complexity blocks are detected and, once detected, a maximum TU size may be set for the block such that the maximum TU size is less than a largest available TU size (i.e., per a codec standard), a CU split may be forced for the block, or other techniques may be used as discussed herein such that a non-optimized (with respect to SSE based rate distortion) coding structure is used.

In some embodiments, for a portion of a video frame such as CTU or other largest coding block, a first rate distortion value generated using a first distortion metric is used to determine an optimal coding structure for the portion. In an embodiment, the first distortion metric is an SSE metric such that the optimal coding structure minimizes SSE based rate distortion. As used herein, the term SSE includes any sum of squared errors distortion measurement technique such as a determination of a residual block (e.g., a difference block between a predicted block and an input block) for the portion or the pertinent coding unit and summing the squares of each residual value in the residual block. As used herein, the term coding structure indicates any data structure indicative of how the portion is to be coded. For example, the coding structure may include CU or coding block sizes of the portion, CTU, or other largest coding block, coding modes for each of the CUs or coding blocks (or for prediction units or blocks thereof), and a TU size for each of the CUs or coding blocks. The coding structure may also indicate other coding information as is known in the art. Furthermore, the coding structure or a related data structure includes the SSE distortion for the coding structure. That is, in some embodiments, SSE is used to determine the CU or coding block sizes, coding modes, and TU sizes that are optimal for the portion and or to rank coding structures including such characteristics. For example, using the first rate distortion values using the first rate distortion metric, a ranking of coding structures (or records) for coding the portion, CTU, or other largest coding block, having the same information as the optimal coding structure may be generated with the optimal coding structure having the best scoring using the first distortion metric and the remaining coding structures ranked using the first distortion metric. Notably, SSE, which replaced sum of absolute transformed differences (SATD) in some systems, provides a significant improvement to the optimization of video compression based on objective quality metrics.

Although SSE provides significant improvement, some artifacts persist. To reduce or eliminate such artifacts, in some embodiments, high spatial and temporal complexity portions or CUs of a frame are detected and, once detected, a maximum TU size may be set to a lower value than that permitted by the pertinent codec and/or CU splits may be forced. For example, although larger TUs and/or CUs may be permitted by the codec, smaller TU size and/or CU sizes than those that would be selected using rate distortion based on SSE are selected. In some embodiments, the CU size(s) and TU size(s) of a candidate coding structure are analyzed. If both the CU size(s) and TU size(s) meet or exceed respective thresholds (e.g., a large block and large TU are detected), a second distortion metric for the candidate coding structure is used. In some embodiments, the second distortion metric is an SAD metric such that the candidate coding structure (based on SSE) for large block and TU contexts is used to generate the SAD metric. As used herein, the term SAD includes any sum of absolute differences distortion measurement technique such as a determination of a residual block (e.g., a difference block between a predicted block and an input block) and summing the absolute value of each residual value in the residual block. In some embodiments, the second distortion metric is a sum of absolute transform differences (SATD) metric such that the candidate coding structure (based on SSE) for large block and TU contexts is used to generate the SAD metric. As used herein, the term SATD includes any sum of absolute transform differences distortion measurement technique such as a determination of a residual block (e.g., a difference block between a predicted block and an input block), transformation of the residual block to the frequency domain, and summing the absolute value of each transformed residual value in the transformed residual block. If the SAD or SATD distortion for the portion, CTU, other largest coding block, or pertinent coding block exceeds a SAD threshold, the candidate coding structure is disabled either by discarding the candidate coding structure or by setting the SSE distortion to a high value (ensuring the candidate coding structure is not selected in the encode pipeline). Thereby, herein, the determination of high spatial complexity and high temporal complexity blocks is based on SAD or SATD distortion measurement of the block and thresholding. Notably, when the mode of the block is inter, the SAD or SATD distortion value measures temporal complexity and when the mode of the block is intra, the SAD or SATD distortion value measures spatial complexity. Herein, techniques are discussed with respect to SAD for the sake of clarity of presentation; however, in any such contexts SATD may be used in its place.

Responsive to exceeding the SAD or SATD threshold, additional encode techniques are applied. In some embodiments, a coding unit split is forced for the portion (or previous CU). For example, if the candidate coding structure included a 32×32 intra CU, the encode may force a split into four 16×16 CUs for that portion. In addition or in the alternative, a TU split or a TU size maximum (below that supported by the codec) may be forced for the portion. For example, if the candidate coding structure included a 32×32 TU for the 32×32 intra CU, a maximum size of TU for the portion may be set to 16×16 (or even 8×8). As used herein, such dimensions indicate pixel dimensions of a video frame. Furthermore, throughout, discussion relative to CUs, TUs, CTUs, etc. is used relative to HEVC (High Efficiency Video Coding/H.265/MPEG-H Part 2). However, such video frame portions may be described as coding blocks, transform blocks, largest coding blocks, macroblocks, etc.

After disabling of the discussed candidate coding structure, a second candidate coding structure is selected for the portion such that the second candidate coding structure follows the discussed forced CU splits and/or TU splits and has a lowest SSE distortion among those candidate coding structure. Notably, the second candidate coding structure has a higher SSE distortion than that of the disabled candidate coding structure and may therefore be deemed suboptimal in the SSE encode pipeline and relevant to objective distortion. However, such change in coding structure provides for improved subjective video quality. The portion of the video frame is then encoded using the second candidate coding structure to generate a bitstream.

FIG. 1 is an illustrative diagram of an example system 100 for coding video 101 to bitstream 105, arranged in accordance with at least some implementations of the present disclosure. As shown in FIG. 1, system 100 includes an SSE mode check module 111, a large block and transform detection module 112, an SAD block validation module 113, a candidate disable module 114, a mode selection module 115, and an encode module 116. Each of SSE mode check module 111, large block and transform detection module 112, SAD block validation module 113, candidate disable module 114, mode selection module 115, and encode module 116 are illustrated separately for the sake of clarity. However, such modules may be implemented in the same or different encode software, hardware, firmware, etc.

System 100 provides video compression and system 100 may be a portion of a video encode system implemented via a computer or computing device such as a server system or the like. For example, system 100 receives video 101 (e.g., video data) and generates bitstream 105 that may be decoded by a decoder to generate a decompressed version of video 101. Bitstream 105 may be compatible with a video compression-decompression (codec) standard such as, for example, HEVC. Although discussed herein with respect to HEVC, the disclosed techniques may be implemented with respect to any codec such as AVC (Advanced Video Coding/H.264/MPEG-4 Part 10), VVC (Versatile Video Coding/MPEG-I Part 3), VP8, VP9, Alliance for Open Media (AOMedia) Video 1 (AV1), the VP8/VP9/AV1 family of codecs, etc. System 100 may be implemented via any suitable device such as, for example, server, a personal computer, a laptop computer, a tablet, a phablet, a smart phone, a digital camera, a gaming console, a wearable device, a display device, an all-in-one device, a two-in-one device, or the like. For example, as used herein, a system, device, computer, or computing device may include any such device or platform.

System 100 may include other modules not shown for the sake of clarity of presentation. For example, system 100 may include a downsampler and an encode controller, a transform module, a quantization module, an intra prediction module, an inter prediction module, a reference picture buffer, a scanning module, an entropy encoder, etc., which may be implemented via encode module 116. Furthermore, some of such components are discussed herein with respect to FIG. 11. Such modules are known to those of skill in the art and are not discussed further herein with respect to FIG. 1 for the sake of clarity of presentation.

As shown, system 100 receives video 101. Video 101 may include any video sequence for encode. Such video may include any suitable video frames, video pictures, sequence of video frames, group of pictures, groups of pictures, video data, or the like in any suitable resolution. For example, the video may be video graphics array (VGA), high definition (HD), Full-HD (e.g., 1080p), 4K resolution video, 8K resolution video, or the like, and the video may include any number of video frames, sequences of video frames, pictures, groups of pictures, or the like. Techniques discussed herein are discussed with respect to frames, portions, coding units, and transform units, having various sizes for the sake of clarity of presentation. As used herein, a coding unit or block may be any size and shape such that it includes a plurality of pixel samples (typically square or rectangular) in any suitable color space such as YUV. Furthermore, coding unit or block may have prediction units or sub-blocks, which also may be characterized as blocks herein. Also a coding unit or block may be optionally divided into a transform unit or transform block for the purposes of transformation of residuals. As used herein, the term size indicates the size of such coding units, transform units, etc. and does not necessarily include the unit itself. The term coding unit or transform unit may indicate the size thereof. Such frames may be characterized as pictures, video pictures, sequences of pictures, video sequences, etc., such coding units or blocks may be characterized as largest coding units, coding units, coding blocks, macroblocks, sub-units, sub-blocks, etc.

For example, a picture or frame of color video data may include a luminance plane or component and two chrominance planes or components at the same or different resolutions with respect to the luminance plane. The video may include pictures or frames that may be divided into blocks of any size, which contain data corresponding to blocks of pixels. Such blocks may include data from one or more planes or color channels of pixel data. For example, a block may be a coding unit or a partition thereof. In the context of the High Efficiency Video Coding (HEVC), the HEVC standard defines a coding tree unit (CTU) for a picture (e.g., a video frame of a video sequence) that may be partitioned into coding units (CUs) that take the form of rectangular blocks having variable sizes. Such coding units may be used as the basic unit or block for coding. Such coding units may be partitioned into transform units (TUs) for transform that also take the form of rectangular blocks (typically square) having variable sizes. However, as discussed, the block of video data may include any block of video data and any coding standard may be used.

Bitstream 105 may be any bitstream representative of video 101 such as an HEVC compliant bitstream or a bitstream compliant to any other codec. During encode of frames of video 101, any number of coding modes, coding unit partitions, transform unit partitions, and so on are evaluated to arrive at final coding modes for units or portions of video 101. Such final coding modes for video 101 as well as other coding information are provided in bitstream 105.

During encode, a video frame is divided into spatial blocks or portions that are predicted from the pixels surrounding the block or portion (spatial/intra prediction) or from pixels of a prior or subsequent frame with a similar region to the block or portion (temporal/inter prediction). The block or portion may optionally be divided into different size sub-blocks or sub-portions that have different modes (e.g., intra has several different direction such as horizontal or vertical prediction and inter can utilize forward/backward/bidirectional prediction). The decision between all of these choices may be performed by analyzing the rate (or estimated rate such as how many bits required for particular modes) and the distortion (or amount of error comparing an original frame portion to a predicted frame portion).

Figure 2:
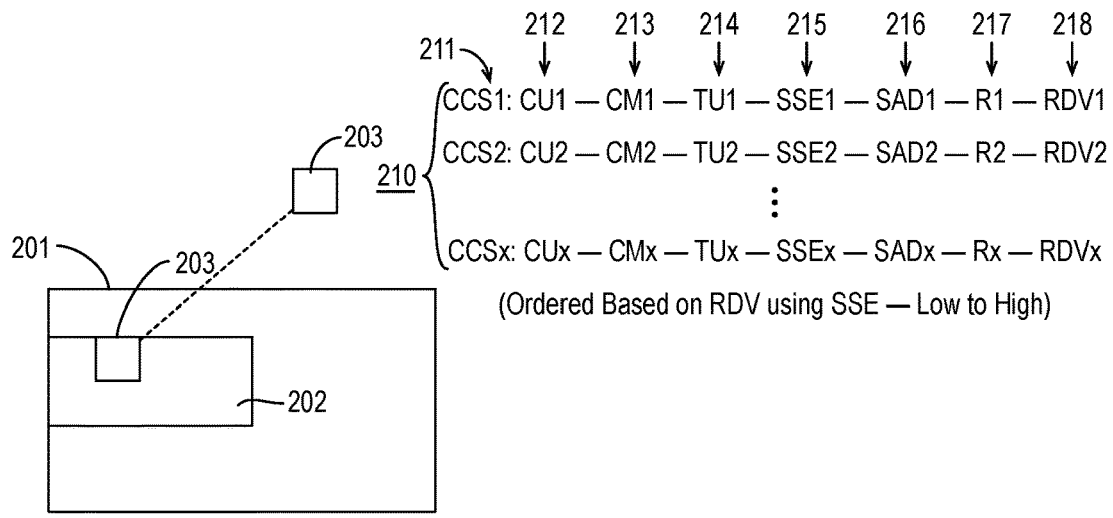
FIG. 2 illustrates an example video frame.

FIG. 2 illustrates an example video frame 201, arranged in accordance with at least some implementations of the present disclosure. As shown, video frame 201 may be segmented into one or more slices as illustrated with respect to slice 202 of video frame 201. Furthermore, video frame 201 may be segmented into one or more blocks or portions as illustrated with respect to block 203. As discussed further herein, block 203 may be further divided into transform blocks. In some embodiments, video frame 201 is segmented into coding blocks, which are segmented into transform blocks. However, any picture structure may be used that divides the frame into macroblocks, blocks, units, sub-units, etc. As used, herein, the term block may refer to any partition or sub-partition of a video picture that is at the sub-picture and sub-slice level. For example, a block may refer to a coding unit, a prediction unit, a transform unit, a macroblock, a coding block, a prediction block, a transform block, or the like. In some embodiments, a transform block includes transform coefficients transformed to the frequency domain from the spatial domain (e.g., either residual pixel values or pixel values) such that the transform coefficients are subsequently quantized to quantized transform coefficients as discussed herein. As used herein, the term portion of a video frame indicates any spatial region of a video frame. For example, block 203 is an example portion of video frame 201.

For block 203, or any other portion of video frame 201, any number of candidate coding structures 210 are evaluated. Candidate coding structures 210 may include any number of candidate coding structures 210 such that each candidate coding structure 211 thereof includes a coding unit structure 212, a coding mode structure 213, a transform unit structure 214, an SSE distortion 215, and a SAD distortion 216. Coding unit structure 212 may have any suitable data structure that indicates how (and if) block 203 is to be segmented into coding units. As used herein, the term coding unit indicates a unit that can be coded and/or predicted separately with respect to other coding units. For example, coding unit structure 212 may include split flags indicating the partitioning of block 203 into coding units or coding blocks.

Figure 3:
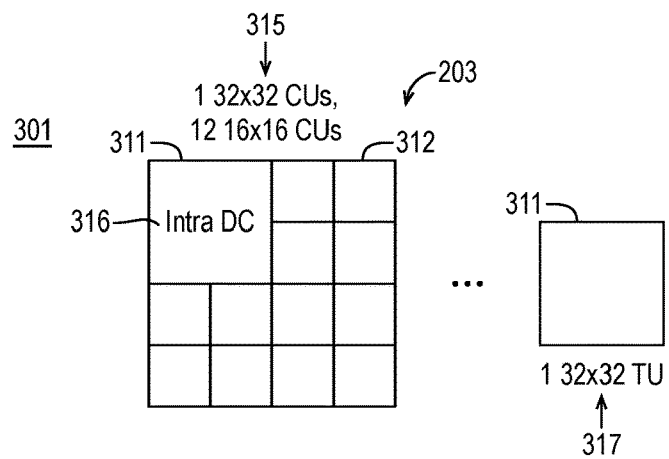
FIG. 3 illustrates an example candidate coding structure for an exemplary video block.

FIG. 3 illustrates an example candidate coding structure 301 for exemplary video block 203, arranged in accordance with at least some implementations of the present disclosure. As shown, block 203 (or a portion of video frame 201) may be partitioned, as indicated by coding unit structure 301 into one 32×32 coding unit and 12 16×16 coding units 312 (as indicated by coding unit sizes 315). For example, coding unit structure 212 (CU1) may define that, for encode and decode, block 203 having a size of 64×64 pixels is divided into f one 32×32 coding unit and 12 16×16 coding units 312. Notably, coding unit structure 212 may define partitioning of block 203 (e.g., a coding tree unit or other largest available coding structure) into any sizes enabled by the pertinent codec. In some embodiments, block 203 has a size of 64×64 pixels and coding unit structure 212 may divide block 203 into coding units into sizes of 64×64, 32×32, 16×16, 8×8, and 4×4. However, any suitable sizes and shapes (including square and/or rectangular) may be used. It is noted that in some embodiments, coding unit structure 212 indicates no partitioning of block 203 such that the coding unit and the block or portion are the same spatially.

Returning to FIG. 2, coding mode structure 213 may have any suitable data structure that indicates the coding mode of each coding unit as indicated by coding unit structure 212. That is, coding mode structure 213 indicates the coding mode to be used in encode and decode for each of the coding units as defined by coding unit structure 212. As discussed, candidate coding structures 210 indicate candidates for encode which are used for evaluation to determine an ultimate final coding structure for block 203.

With reference to FIG. 3, as shown, coding unit 311 is indicated as having a coding mode 316 of intra DC in candidate coding structure 301. Other available coding modes include directional intra modes (horizontal, vertical, directional), intra planar, inter modes (including a reference frame and motion vector), etc. In the example of FIG. 3, only coding mode 316 of coding unit 311 is illustrated for the sake of clarity. It is noted that coding units 312 would also have coding modes indicated by candidate coding structure 301.

Returning again to FIG. 2, transform unit structure 214 may have any suitable data structure that indicates the transform unit size for each coding unit indicated by coding unit structure 212. That is, transform unit structure 214 indicates the transform unit size to be used in encode and decode for transform (of residuals to the frequency domain) of each of the coding units as defined by coding unit structure 212.

With reference to FIG. 3, coding unit 311 is indicated as having a single transform unit that is the same spatially as coding unit 311 (e.g., they completely overlap) with the transform unit having a transform unit size 317 of 32×32 pixels. Other available transform unit sizes may be defined by the pertinent codec and typically include 32×32, 16×16, 8×8, and 4×4 with other sizes and shapes sometimes being implemented. In the example of FIG. 3, a transform unit is shown only with respect to coding unit 311 (having transform unit size 317) is illustrated for the sake of clarity. It is noted that coding units 312 would also have transform unit sizes indicated by candidate coding structure 301.

Referring now to FIG. 2, coding unit structure 212, coding mode structure 213, and transform unit structure 214 at least partially define candidate coding structure 301. Such structures may be provided separately or together to define candidate coding structure 301. Furthermore, candidate coding structure 301 may include (or may be supplemented later in an encode pipeline with) other coding structure indicators or information such as transform type selection, in-loop filter selections, etc. as available in the pertinent codec. As shown, each of candidate coding structures 210 (1 to x) include corresponding coding unit structures, coding mode structure, and transform unit structure.

Candidate coding structures 210 may be generated using any suitable technique or techniques that evaluate coding unit splits, modes, transform unit splits, and so on including exhaustive techniques or other techniques that limit split depth evaluation, etc. Furthermore, the techniques discussed herein with respect to disabling particular candidate coding structures 210 may be performed after a complete record of candidate coding structures 210 are generated or on the fly as candidate coding structures 210 are generated, evaluated, and prioritized.

As shown in FIG. 2, each of candidate coding structures 210 (or a separate data structure) further includes the SSE distortion and SAD distortion thereof. For example, candidate coding structure 211 includes SSE distortion value 215 and SAD distortion value 216. Herein, the terms SSE and SSE distortion may be used interchangeably. As discussed, SSE distortion may be generated by summing squared residual values for a residual block that is the difference between a predicted block and an original block and SAD distortion may be generated by summing absolute values of residual values for the residual block. As used herein the term distortion value indicates any SSE or SAD distortion discussed herein. Furthermore, the terms distortion value determined by application of a distortion measurement technique to a block or portion based on a candidate coding structure indicates the distortion value is generated using the corresponding measurement technique (i.e., SSE or SAD) by applying the technique to a predicted block or portion generated using the coding structure. For example, such terms indicate the predicted block or portion is generated, difference with the corresponding original block or portion, and the resultant residual is used to determine the distortion value.

Each of candidate coding structures 210 (or a separate data structure) also includes the rate or estimated rate (i.e., the number of bits needed to encode block 203 using the candidate coding structure) as well as the rate distortion value for the candidate coding structure. For example, each of candidate coding structures 210 includes a rate value and a rate distortion value as indicated with respect to rate value 217 and rate distortion value 218 of candidate coding structure 211. The rate values and rate distortion values may be generated using any suitable technique or techniques. In some embodiments, the rate is estimated as the number of bits used to encode block 203 using the candidate coding structure. The rate distortion value may be any suitable rate distortion based on the SSE distortion value (and exclusive of the SAD distortion value). That is, only SSE distortion is used in generating the rate distortion value. In some embodiments, each rate distortion value is a sum of the rate value and the SSE distortion. In some embodiments, rate distortion value is a sum of the SSE distortion and a product of the rate value and a Lagrangian.

As shown in FIG. 2, candidate coding structures 210 are ranked or rated based on the rate distortion value thereof. As discussed, the rate distortion values such as rate distortion value 218 includes a sum of the SSE distortion such as SSE distortion 215 and a rate value such as rate value 217 with either or both multiplied by a factor. For example, the rate value may be multiplied by a Lagrangian as is known in the art. Herein, the terms SSE and SSE distortion may be used interchangeably. For example, in candidate coding structures 210, RDV1 is less than RDV2, which is less than RDV3, and so on, through RDVx. Furthermore, the SSE values, the rate values, and the rate distortion values may be updated and/or refined as the encode pipeline processes video 101. As discussed, in some contexts, a final coding structure for block 203 is selected from candidate coding structures 210 as the coding structure having a minimum rate distortion value or an optimal rate distortion. When block 203 has high spatial and temporal complexity, all of the SSE distortion values across candidate coding structures 210 may be relatively high and substantially uniform. In such contexts, the minimum rate distortion value then defaults to one of candidate coding structures 210 that has a low rate value, which often has a low complexity structure including few coding units, transform units, etc. Such candidate coding structure selection may, in turn, provide blocking and other artifacts.

Returning now to FIG. 1, SSE mode check module 111 generates candidate coding structures 102, which may include any number of candidate coding structures 210 such as a single candidate coding structure (e.g., an SSE rate distortion optimized candidate coding structure), a predefined number of candidate coding structures (e.g., 3, 5, or more candidate coding structures), etc. Large block and transform detection module 112 receives candidate coding structures 102 and detects candidate coding structures 102, if any, having both large coding unit size(s) and large transform unit size(s). Large block and transform detection module 112 may detect large coding unit and transform unit candidate coding structures using any suitable technique or techniques. In an embodiment, large block and transform detection module 112 compares the coding unit size(s) to a first threshold (i.e., a coding unit size threshold) and the transform unit size(s) to a second threshold (i.e., a transform unit size threshold). If both meet or exceed their respective threshold, a large block and transform candidate coding structure is detected.

Figure 4:
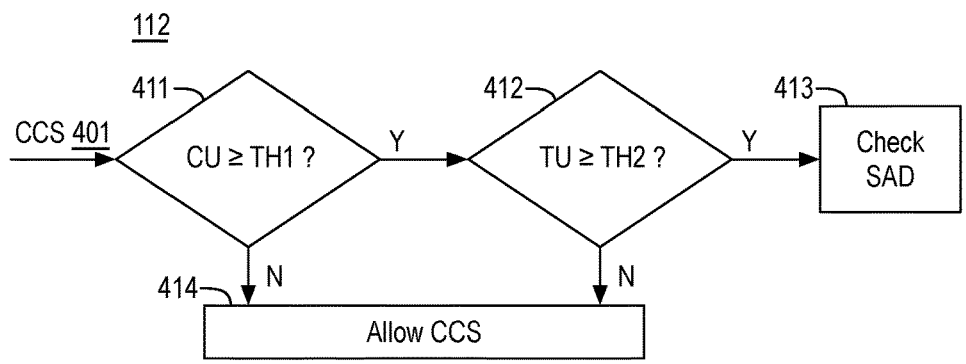
FIG. 4 illustrates an example implementation of a large block and transform detection module.

FIG. 4 illustrates an example implementation of large block and transform detection module 112, arranged in accordance with at least some implementations of the present disclosure. As shown, a candidate coding structure 401 (e.g., any of candidate coding structures 102 or candidate coding structures 210) are received and processed at decision operations 411, 412. At decision operation 411, a determination is made as to whether any coding unit size in candidate coding structure 401 meets or exceeds a first threshold (i.e., a coding unit size threshold). The coding unit size threshold may be any suitable size. In an embodiment, the coding unit size threshold is 32×32 such that any coding unit size of 32×32 or greater triggers a large block. In an embodiment, the coding unit size threshold is 16×16 such that any coding unit size of 32×32 or greater triggers a large block. In an embodiment, the coding unit size threshold is 32×32 such that any coding unit size of 32×32 or greater triggers a large block.

As shown, if a large block is not detected at decision operation 411, processing continues at operation 414 where candidate coding structure 401 is allowed. For example, with reference to large block and transform detection module 112 of FIG. 1, if a large block is not detected, processing continues at encode module 116 where candidate coding structure 401 may be used for encode.

If a large block is detected at decision operation 411, processing continues at decision operation 412, where a determination is made as to whether any transform unit size in candidate coding structure 401 meets or exceeds a second threshold (i.e., a transform unit size threshold). The transform unit size threshold may be any suitable size. In an embodiment, the coding unit size threshold is 16×16 such that any transform unit size of 16×16 or greater triggers a large transform. In an embodiment, the coding unit size threshold is 32×32 and the transform unit size threshold is 16×16.

If a large transform is not detected at decision operation 412, processing continues at operation 414 where candidate coding structure 401 is allowed. As above, with reference to large block and transform detection module 112 of FIG. 1, if a large transform is not detected, processing continues at encode module 116 where candidate coding structure 401 may be used for encode. Notably, if a large block and a large transform are not detected, the SSE based rate distortion optimization is used for encode decisions.

If a large transform is detected at decision operation 412, processing continues at operation 413, where an SAD based distortion evaluation is made for candidate coding structure 401 as discussed further herein. For example, if both a large block and a large transform are detected, candidate coding structure 401 is further evaluated based on SAD distortion to determine whether candidate coding structure 401 is to be disabled, despite potentially having an optimal rate distortion value based on SSE.

Returning to FIG. 1, when a candidate coding structure of candidate coding structures 102 has a large block and large transform, processing continues at SAD block validation module 113, which generates or retrieves (if previously generated) the SAD distortion value for the block or portion of video. SAD block validation module 113 then compares the SAD distortion value to a threshold (i.e., a threshold distortion value or a threshold SAD value). For example, the SAD distortion value for block 203 is compared to the threshold SAD value (and optionally generated) in response to a large block and a large transform being detected as discussed.

The threshold SAD value may be any suitable value and is dependent on the size (e.g., in pixels) of the portion and may be dependent upon the QP of the portion, a quality target for the portion, etc. Furthermore, the threshold SAD value may depend on the size of the large block detected, the size of the large transform unit, and/or the whether the large block is an inter block or an intra block, as discussed further herein with respect to FIGS. 7, 8, and 9.

As shown, if the SAD distortion value for the portion does not exceed the threshold SAD value, processing continues at encode module 116 where the candidate coding structure of candidate coding structures 102 may be used for encode. That is, the candidate coding structure having the large block and large transform is not disabled due to the SAD of the candidate coding structure comparing favorably to the threshold SAD value. As discussed, in some embodiments, the portion being evaluated is the same as the large block (or large CU) that is detected. In such embodiments, the SAD distortion for the portion and the large block are the same and the measured SAD distortion is compared to the threshold. In other embodiments, the portion corresponding to the candidate coding structure is larger than the large block or coding unit (e.g., the large block is one of several blocks or coding units that together make up the portion). In such embodiments, the SAD distortion for the entirety of the portion or the SAD distortion for the detected large block or coding unit itself may be compared to the threshold SAD value. The former techniques offer the advantages of simplicity in that the threshold SAD value may be used for all blocks or portions of video frame as such blocks or portions are the same size.

If the SAD distortion value is not exceeded at SAD block validation module 113, processing continues at disable module 114, where the large block and large transform candidate coding structure having a SAD distortion that exceeds the threshold is disabled. The candidate coding structure may be disabled using any suitable technique or techniques. In some embodiments, the candidate coding structure is deleted or flagged for removal from consideration as an encode candidate. In some embodiments, the SSE distortion for the candidate coding structure is set to a maximum or high value such that the candidate coding structure will not be selected. Such techniques offer the advantage of maintaining the other information recorded in the candidate coding structure for use in encode as needed.

As discussed, candidate coding structures 102 may include a single candidate coding structure or multiple ranked candidate coding structures. When a single candidate coding structure is used, the candidate coding structure is disabled and processing may continue at SSE mode check module 111 where a next candidate coding structure is selected and evaluated at modules 112, 113, 114 as discussed. Any number of such candidate coding structures may be evaluated in such a manner until encode is performed or until a list of candidate coding structures are provided at mode selection module 115. In some embodiments, such on the fly processing may obviate the need for mode selection module 115. In some embodiments, a batch or list of candidate coding structures are provided in candidate coding structures 102 and those that are not disabled may be provided at mode selection module 115. In such embodiments, the remaining candidate coding structures are evaluated using SSE distortion and any additional encode variables to generate a selected candidate coding structure 104. As shown, selected candidate coding structure 104 is provided to encode module 116 for use in encode of video 101 to generate bitstream 105. Encode module 116 may perform any suitable actions to generate bitstream 105 such as differencing original pixel blocks from predicted pixel blocks to generate residual blocks, transforming and quantizing the residual blocks, entropy encoding the transformed and quantized residuals, performing local decode and optional in loop and/or out of loop filtering to generate reconstructed blocks for use in further prediction, and so on.

The discussed techniques apply when spatial and temporal complexity is high such that spatial complexity refers to the complexity of the block. For example, a flat block would have all pixels with same or similar values while a high complexity block has lots of detail causing the distortion for the intra modes high. Temporal complexity is high when there is a lot of changes frame to frame. When the distortion is similarly high for both temporal and spatial (e.g., inter and intra) components, the main differentiator is the rate. Since the largest block with the largest transform size has the lowest rate, it has a tendency to have the lowest rate distortion value and may be selected for encode. However, the large intra or inter block with a large transform may produce large subjective block artifacts. The techniques discussed herein resolve or ameliorate this issue by allowing the encoder pipeline to continue to use the SSE distortion to determine winning candidate coding structures and to sort them based on the SSE distortion, which is optimal from an objective quality perspective. SAD based distortions are then used to prune the list of candidate coding structures to eliminate those candidate coding structures that are likely to produce visual quality problems given the temporal and spatial complexity. In some embodiments, the candidate coding structures that are disabled get pruned are large intra candidate blocks with large transforms in the large blocks (e.g. 32×32 blocks and transforms). As discussed herein, the candidate coding structure pruning or disabling decisions are made dynamically according to the candidate list of candidate coding structures. Such techniques provide improved subjective visual quality with minimal impact to compression loss.

As discussed, in some embodiments, in response to a candidate coding structure having a large block and a large transform in the block, as well as a SAD distortion that exceeds a threshold, the candidate coding structure may be disabled or one or both of a block (coding unit) split or a transform size split may be forced on the candidate coding structure. In some embodiments, such disabling or forced splits may have the same impact on encode as discarding large block and large transform best candidate coding structures effectively discards all candidate coding structures having the same block and transform structures.

Figure 5:
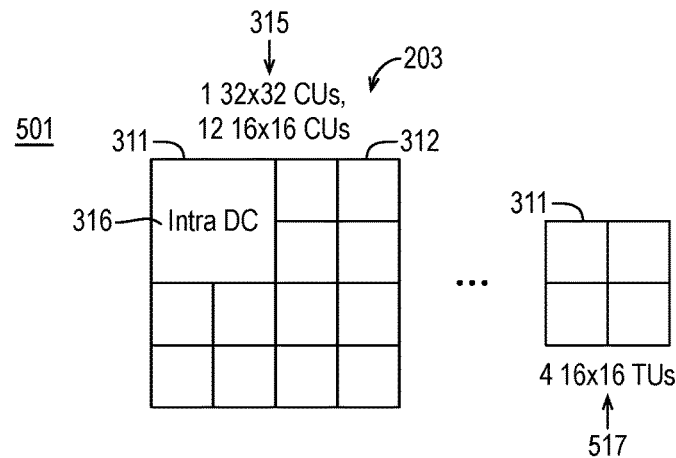
FIG. 5 illustrates an example forced transform unit split for an example candidate coding structure to provide a modified candidate coding structure.

FIG. 5 illustrates an example forced transform unit split for example candidate coding structure 301 to provide a modified candidate coding structure 501, arranged in accordance with at least some implementations of the present disclosure. As shown, block 203 (or a portion of video frame 201) may be partitioned, as indicated by coding unit structure 501 into one 32×32 coding unit and 12 16×16 coding units 312 as discussed with respect to FIG. 3. As discussed with respect to FIG. 3 coding unit structure 301 also included a single transform unit having a transform unit size 317 equal to the size of coding unit 311. In contrast, in FIG. 5, coding unit structure 501 has had a forced transform unit split to provide four 16×16 transform units (as indicated by transform unit size 517) for coding unit 311 or additional smaller transform units (e.g., 8×8 transform units). Such techniques may be applied as a minimum transform unit size of 16×16 (or 8×8) for the coding unit structure for example.

Figure 6:
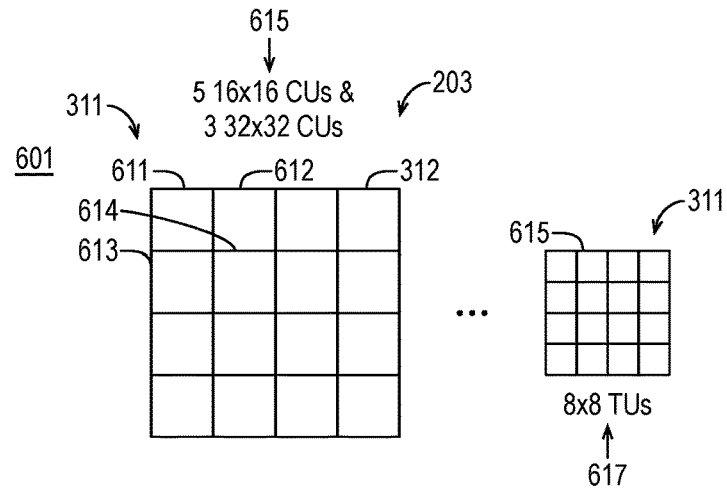
FIG. 6 illustrates an example forced coding unit split and transform unit split for an example candidate coding structure to provide a modified candidate coding structure.

FIG. 6 illustrates an example forced coding unit split and transform unit split for example candidate coding structure 301 to provide a modified candidate coding structure 601, arranged in accordance with at least some implementations of the present disclosure. As shown, block 203 (or a portion of video frame 201) may be partitioned, as indicated by coding unit structure 601 into 16 16×16 coding units. Notably, in contrast to coding unit 311, coding unit structure 601 may have forced the corresponding pixel area into four 16×16 coding units 611, 612, 613, 614 (or smaller). Furthermore, the area of coding unit 311 may have a forced transform unit split to provide four 8×8 transform units 615 (as indicated by transform unit size 617) for each of coding units 611, 612, 613, 614 or additional smaller transform units (e.g., 8×8 transform units). As discussed with respect to FIG. 5, such techniques may be applied as a minimum transform unit size (8×8) for the coding unit structure. In the example of FIG. 6, both a forced coding unit split and a forced transform unit split are implemented. In some embodiments, just a forced coding unit split is implemented.

With reference to FIG. 1, in some embodiments, the SAD distortion threshold implemented at SAD block validation module 113 may be the same regardless of the details of the candidate coding structure. In other embodiments, the SAD distortion threshold may be selected based on characteristics of the candidate coding structure. It is noted that the varying thresholds are implemented with respect to the same size portion of the video frame. For example, the below techniques discussed with respect to large block size (e.g., a smaller threshold for larger blocks) is not related to the pixel area being evaluated in the SAD distortion comparison to the threshold.

Figure 7:
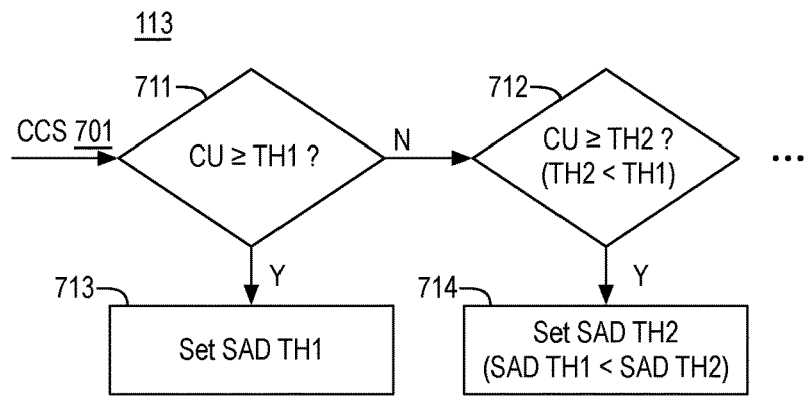
FIG. 7 illustrates an example implementation of distortion threshold setting based on detected coding unit size as performed by a SAD block validation module.

FIG. 7 illustrates an example implementation of distortion threshold setting based on detected coding unit size as performed by SAD block validation module 113, arranged in accordance with at least some implementations of the present disclosure. As shown, a candidate coding structure 701 (e.g., any of candidate coding structures 102 or candidate coding structures 210 having a large block and transform) is received and processed at decision operations 711, 712. At decision operation 711, a determination is made as to whether any coding unit (or block) size in candidate coding structure 701 meets or exceeds a first threshold (i.e., a first coding unit size threshold). The first coding unit size threshold may be any suitable size. In an embodiment, the coding unit size threshold is 32×32 such that any coding unit size of 32×32 or greater triggers use of a first SAD distortion threshold (SAD TH1) as shown with respect to operation 713. If no coding unit (or block) size meets or exceeds the first threshold (TH1), processing continues at decision operation 712, where a determination is made as to whether any coding unit (or block) size in candidate coding structure 701 meets or exceeds a second threshold (i.e., a second coding unit size threshold that is less than the first coding unit size threshold). In an embodiment, the second coding unit size threshold is 16×16 such that any coding unit size of 16×16 or greater triggers use of SAD TH2 as shown with respect to operation 714.

In an embodiment, the first coding unit size threshold is 32×32 such that any coding unit size of 32×32 or greater triggers use of the first threshold and the second coding unit size threshold is 16×16 such that any coding unit size of 16×16 or greater (but less than 32×32) triggers use of a second SAD distortion threshold (SAD TH2) such that the second SAD distortion threshold is greater than the first SAD distortion threshold (SAD TH2>SAD TH1). Such decision operations may also be repeated for yet smaller coding unit or block size triggers such that a yet larger SAD distortion threshold may be used. In an embodiment, three coding unit size thresholds (e.g., 64×64, 32×32, and 16×16 are used) with corresponding SAD distortion thresholds (SAD TH1<SAD TH2<SAD TH3). Notably, when larger coding units or blocks are detected, a smaller SAD distortion threshold may be used (with respect to smaller large coding units or blocks) such that the encoder is more sensitive to providing forced coding unit splits, forced transform unit splits, or disablement of candidate coding structures when such larger coding units or blocks are present in the candidate coding structures. The SAD distortion threshold attained as discussed with respect to FIG. 7 is then implemented for the portion (e.g., block 203 of video frame 201) as discussed with respect to SAD block validation module 113 herein.

Figure 8:
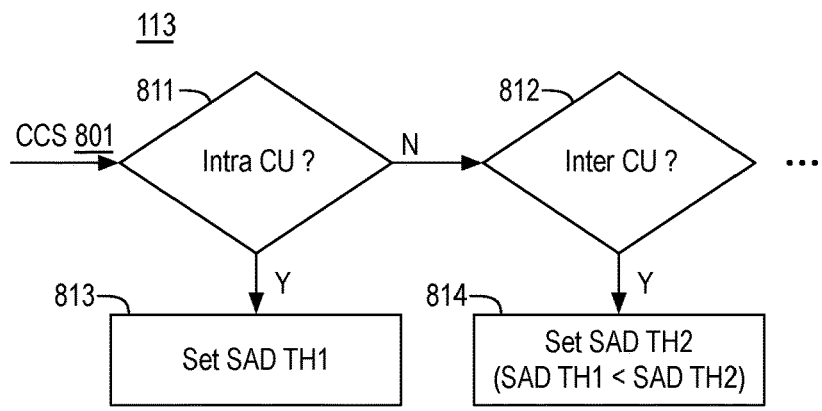
FIG. 8 illustrates an example implementation of distortion threshold setting based on coding mode as performed by a SAD block validation module.

FIG. 8 illustrates an example implementation of distortion threshold setting based on coding mode as performed by SAD block validation module 113, arranged in accordance with at least some implementations of the present disclosure. As shown, a candidate coding structure 801 (e.g., any of candidate coding structures 102 or candidate coding structures 210 having a large block and transform) is received and processed at decision operations 811, 812. At decision operation 811, a determination is made as to whether the detected large coding unit (or block) in candidate coding structure 801 is an intra coding unit (e.g., has any intra mode for encode). In instances where multiple large coding units (or blocks) are detected, a determination may be made as to whether any of them are intra mode. If so, processing continues at operation 813, where a first SAD distortion threshold (SAD TH1) is provided for candidate coding structure 801. It is noted that if any non-large coding unit or block of candidate coding structure 801 is intra mode, the decision made at decision operation 811 is not changed.

If no large coding unit or block has an intra mode, processing continues at decision operation 812, where a determination is made as to whether the or any large coding unit (or block) has an inter mode. If so, processing continues at operation 814, where a second SAD distortion threshold (SAD TH2) is provided for candidate coding structure 801 such that the second SAD distortion threshold is greater than the first SAD distortion threshold (SAD TH2>SAD TH1). In some embodiments, inter modes include only those modes where a motion vector, reference frame, and residual are provided for the large coding unit (or block). In such embodiments, remaining modes (e.g., skip, direct, etc.) where no residual is provided, for example, may have yet a larger third SAD distortion (SAD TH3 such that SAD TH3>SAD TH2>SAD TH1). In other embodiments such skip and direct modes are treated as inter modes for the sake of determining the SAD distortion threshold.

For example, when a detected large coding unit or block is intra, a smaller SAD distortion threshold may be used (with respect to inter) such that the encoder is more sensitive to providing forced coding unit splits, forced transform unit splits, or disablement of candidate coding structures when such large intra blocks present in the candidate coding structures. The SAD distortion threshold attained as discussed with respect to FIG. 8 is then implemented for the portion (e.g., block 203 of video frame 201) as discussed with respect to SAD block validation module 113 herein. Notably, it may be advantageous to aggressively disable large intra coding units or blocks because, with complicated content, intra prediction (particularly at high QP) is unable to reproduce details for the large intra coding unit or block. Then, when an encoder, for future frames, attempts to refer to the same block, the block makes a poor temporal predictor and the encoder may again use another large coding unit or block with a large transform since all candidate coding unit or block sizes once again produce poor results. By forcing coding unit splits and/or transform unit splits, may provide more details for the block for use in future frames.

Figure 9:
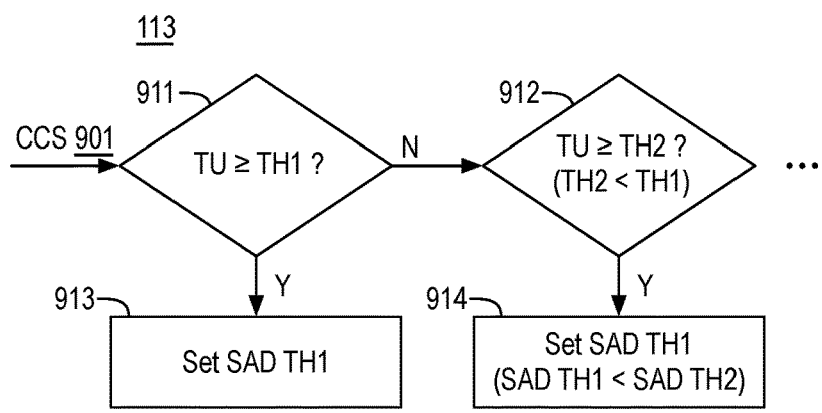
FIG. 9 illustrates an example implementation of distortion threshold setting based on detected transform size as performed by a SAD block validation module.

FIG. 9 illustrates an example implementation of distortion threshold setting based on detected transform size as performed by SAD block validation module 113, arranged in accordance with at least some implementations of the present disclosure. As shown, a candidate coding structure 901 (e.g., any of candidate coding structures 102 or candidate coding structures 210 having a large block and transform) is received and processed at decision operations 911, 912. At decision operation 911, a determination is made as to whether any transform size in candidate coding structure 701 meets or exceeds a first threshold (i.e., a transform size threshold). The transform size threshold may be any suitable size. In an embodiment, the transform size threshold is 32×32 such that any transform size of 32×32 or greater triggers use of a first SAD distortion threshold (SAD TH1) as shown with respect to operation 913. If not, processing continues at decision operation 912, where a determination is made as to whether any transform size in candidate coding structure 901 meets or exceeds a second threshold (i.e., a second transform size threshold that is less than the first transform size threshold). In an embodiment, the second transform size threshold is 16×16 such that any transform size of 16×16 or greater triggers use of SAD TH2 as shown with respect to operation 914.

In an embodiment, the first transform size threshold is 32×32 such that any transform size of 32×32 or greater triggers use of a first SAD distortion threshold (SAD TH1) and the second transform size threshold is 16×16 such that any transform size of 16×16 or greater (but smaller than 32×32) triggers use of a second SAD distortion threshold (SAD TH2) such that the second SAD distortion threshold is greater than the first SAD distortion threshold (SAD TH2>SAD TH1). Such decision operations may be repeated for yet smaller transform sizes in analogy the FIG. 7 In an embodiment, three transform size thresholds (e.g., 64×64, 32×32, and 16×16 are used) with corresponding SAD distortion thresholds (SAD TH1<SAD TH2<SAD TH3).

Furthermore, the techniques discussed with respect to adaptive SAD distortion thresholds based on coding unit size, transform size, and coding mode may be combined. In an embodiment, increasing SAD distortion thresholds may be used across combinations as follows: larger intra coding units (e.g., ≥32×32) have a first SAD distortion threshold (SAD TH1), larger inter coding units (e.g., ≥32×32) have a first SAD distortion threshold (SAD TH2), smaller intra coding units (e.g., ≥16×16) have a third SAD distortion threshold (SAD TH3), and smaller inter coding units (e.g., ≥16×16) have a fourth SAD distortion threshold (SAD TH4) such that SAD TH1<SAD TH2<SAD TH3<SAD TH4. In an embodiment, increasing SAD distortion thresholds may be used across combinations as follows: larger coding units (e.g., ≥32×32) having larger transform units (e.g., ≥32×32) have a first SAD distortion threshold (SAD TH1), larger coding units (e.g., ≥32×32) having smaller transform units (e.g., ≥16×16) have a second SAD distortion threshold (SAD TH2), and smaller coding units (e.g., ≥16×16) having smaller transform units (e.g., ≥16×16) have a third SAD distortion threshold (SAD TH3), such that SAD TH1<SAD TH2<SAD TH3<SAD TH4. Other combinations are available and all share the following rules: all else being equal intra coding units have a smaller SAD distortion threshold than inter coding units, all else being larger coding units have a smaller SAD distortion threshold than smaller coding units, and all else being equal larger transform sizes have a smaller SAD distortion threshold than smaller transform sizes.

Figure 10:
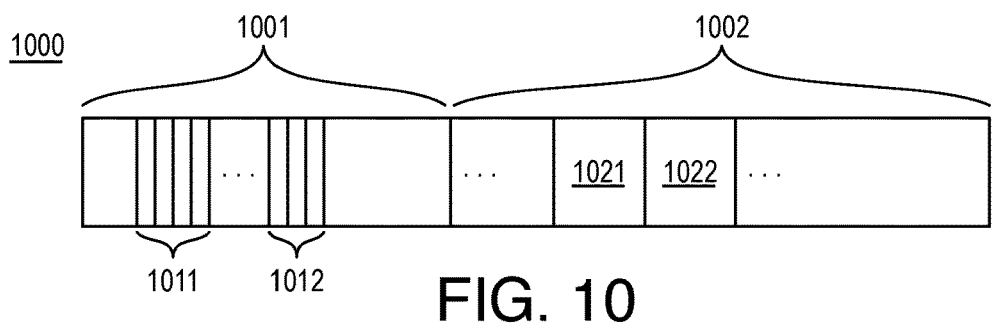
FIG. 10 illustrates an example bitstream.

FIG. 10 illustrates an example bitstream 1000, arranged in accordance with at least some implementations of the present disclosure. Bitstream 1000 may correspond to bitstream 105 herein. As shown in FIG. 10, in some embodiments, bitstream 1000 includes a header portion 1001 and a data portion 1002. Header portion 1001 may include mode decision indicators 1011, 1012 such as block or coding unit level sizes (or split information), bock or coding unit level mode decision indicators, and transform size indicators. For example, mode decision indicators 1011, 1012 may include mode decisions and partitionings of blocks of video that correspond to candidate coding structures as discussed herein including coding unit structure 212, coding mode structure 213, and transform unit structure 214 or similar data structures or data structures that may allow decode of such data structures. Furthermore, data portion 1002 may include block data 1021, 1022, which may include motion vectors, transformed and quantized residual pixel values, etc. for portions or blocks of video data such as block 203. In some embodiments, bitstream 1000 is a standard compliant bitstream. For example, bitstream 1000 may be HEVC compliant, AVC compliant, VVC compliant, VP8 compliant, VP9 compliant, AV1 compliant, or compliant with any other suitable codec. Notably, bitstream 1000 may be transmitted, stored, etc. for eventual decoding by a decoder.

Figure 11:
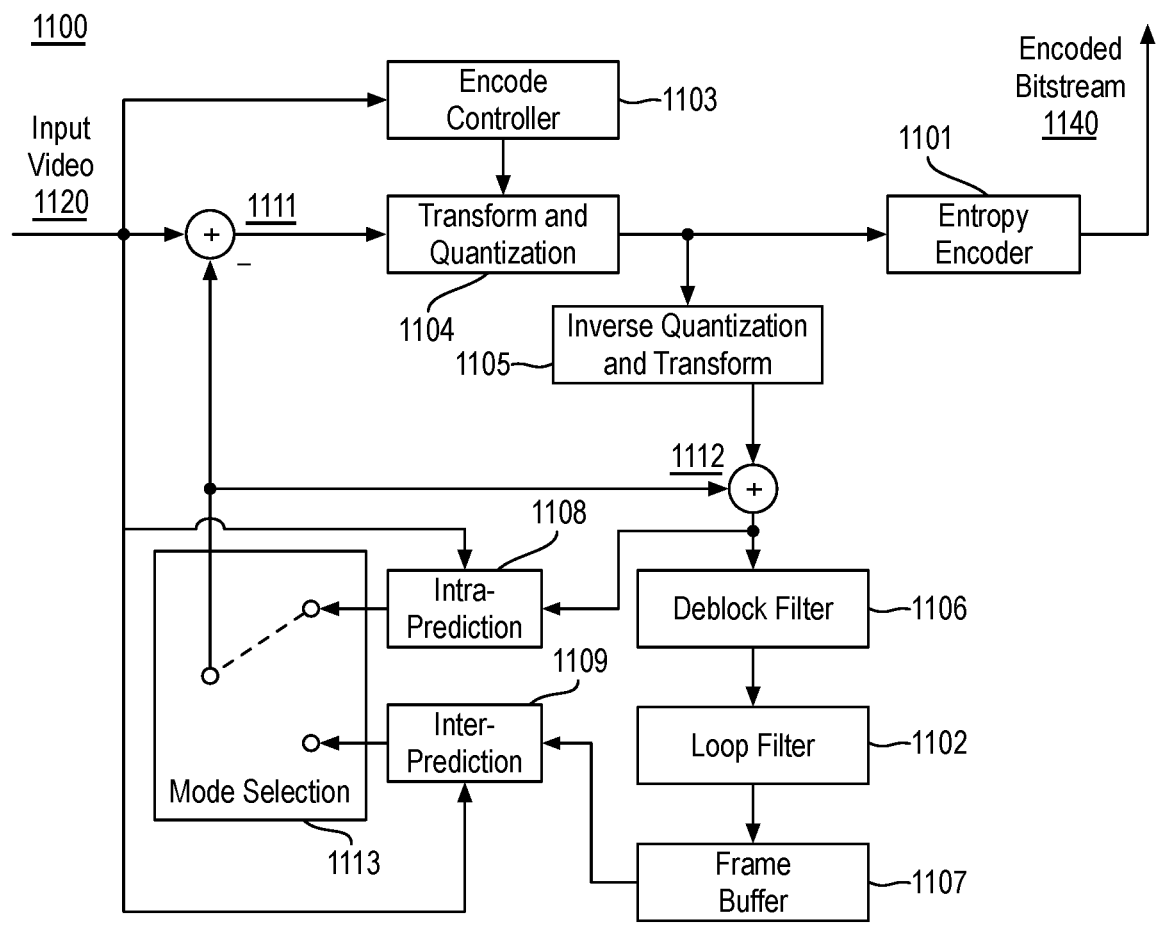
FIG. 11 illustrates a block diagram of an example encoder for performing video coding with improved visual quality for high spatial and temporal complexity video.

FIG. 11 illustrates a block diagram of an example encoder 1100 for performing video coding with improved visual quality for high spatial and temporal complexity video, arranged in accordance with at least some implementations of the present disclosure. As shown, encoder 1100 includes an entropy encoder 1101, a loop filter 1102, an encode controller 1103, a transform and quantization module 1104, an inverse quantization and transform module 1105, a deblock filter 1106, a frame buffer 1107, an intra-prediction module 1108, and an inter-prediction module 1109. Encoder 1100 may include additional modules and/or interconnections that are not shown for the sake of clarity of presentation. Notably, encoder 1100 may implement any of modules 111, 112, 113, 114, 115, 116. In an embodiment, encoder 1100 implements modules 111, 112, 113, 114, 115 via encode controller 1103 and encode module 116 using various components of encoder 11100 such that the illustrated input video 1120 is video 101.

As shown in FIG. 11, encoder 1100 receives input video 1120. Input video 1120 may be in any suitable format and may be received via any suitable technique such as downsampling of video 101, fetching from memory, transmission from another device, etc. As discussed, encode of input video 1120 is controlled, in part by encode controller 1103 such that various encode decisions for input video 1120 are made or influenced by the techniques discussed with respect to FIG. 1 and elsewhere herein. For example, block or CU sizes, transform unit split depths, motion vectors, motion search constraints, intra modes, intra search constraints and so on are implemented via encode controller 1103 using the techniques discussed herein. Frames of input video 1120 may be processed to determine coding portions of thereof (e.g., blocks, coding tree units, coding units, partitions etc.). As shown, input video 1120 may be provided to encode controller 1103, intra-prediction module 1108, and inter-prediction module 1109. The coupling to intra-prediction module 1108 or inter-prediction module 1109 may be made via mode selection module 1113 as shown. For example, mode selection module 1113 may make final mode decisions for portions of video frames of input video 1120, again, based on limited evaluation, searching, etc. as indicated by block level coding controls 1130.

As shown, mode selection module 1113 (e.g., via a switch), may select, for a coding unit or block or the like between an intra-prediction mode and an inter-prediction mode based on large block and large transform and SAD distortion as discussed herein as well as minimum coding cost based on SSE distortion. Based on the mode selection, a predicted portion of the video frame is differenced via differencer 1111 with the original portion of the video frame (e.g., of block level coding controls 1130) to generate a residual. The residual may be transferred to transform and quantization module 1104, which may transform (e.g., via a discrete cosine transform or the like) the residual to determine transform coefficients and quantize the transform coefficients using the frame level QP discussed herein. Such transform operations may be determined under control of block level coding controls 1130 and any partial split depth evaluation. The quantized transform coefficients may be encoded via entropy encoder 1101 into encoded bitstream 1140. Other data, such as motion vector residuals, modes data, transform size data, or the like may also be encoded and inserted into encoded bitstream 1140.

Furthermore, the quantized transform coefficients are inverse quantized and inverse transformed via inverse quantization and transform module 1105 to generate a reconstructed residual. The reconstructed residual may be combined with the aforementioned predicted portion at adder 1112 to form a reconstructed portion, which may be deblocked via deblock filter 1106 and in-loop filtered using loop filter 1102 to generate a reconstructed frame. The reconstructed frame is then saved to frame buffer 1107 and used for encoding other portions of the current or other video frames. Such processing may be repeated any additional frames of input video 1120.

Figure 12:
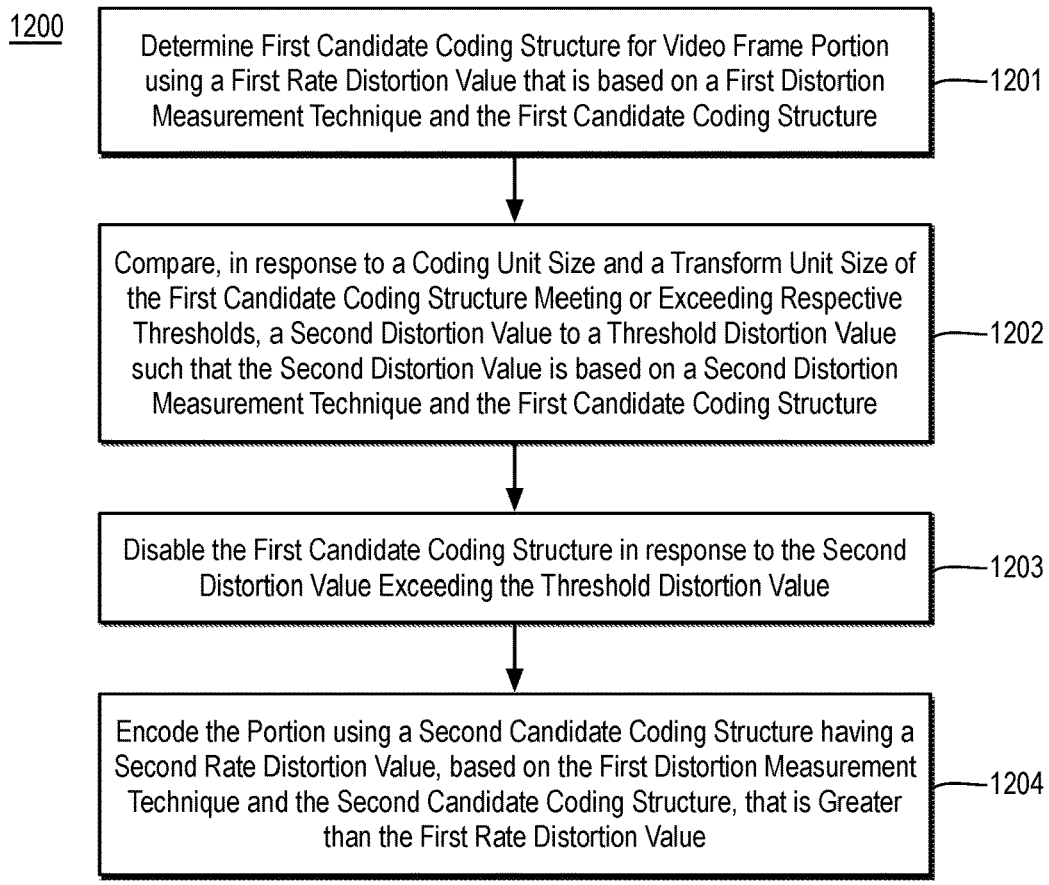
FIG. 12 is a flow diagram illustrating an example process for video coding.

FIG. 12 is a flow diagram illustrating an example process 1200 for video coding, arranged in accordance with at least some implementations of the present disclosure. Process 1200 may include one or more operations 1201-1204 as illustrated in FIG. 12. Process 1200 may form at least part of a video coding process. By way of non-limiting example, process 1200 may form at least part of a video coding process as performed by any device or system as discussed herein such as system 100 and/or encoder 1100. Furthermore, process 1200 will be described herein with reference to system 1300 of FIG. 13.

Figure 13:
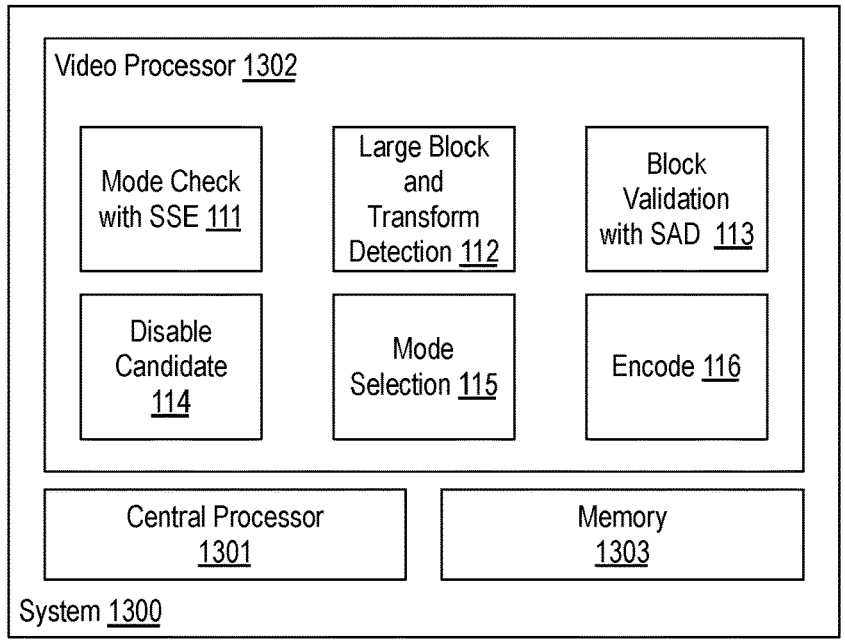
FIG. 13 is an illustrative diagram of an example system for video coding.

FIG. 13 is an illustrative diagram of an example system 1300 for video coding, arranged in accordance with at least some implementations of the present disclosure. As shown in FIG. 13, system 1300 may include a central processor 1301, a video processor 1302, and a memory 1303. Also as shown, video processor 1302 may include or implement SSE mode check module 111, large block and transform detection module 112, SAD block validation module 113, candidate disable module 114, mode selection module 115, and encode module 116. In an embodiment, memory 1303 implements frame buffer 1107. Furthermore, in the example of system 1300, memory 1303 may store video data or related content such as frame data, coding unit data, transform size data, coding mode data, motion vector data, intra mode decision data, transform unit split depth data, bitstream data, and/or any other data as discussed herein.

As shown, in some embodiments, SSE mode check module 111, large block and transform detection module 112, SAD block validation module 113, candidate disable module 114, mode selection module 115, and encode module 116 are implemented via video processor 1302. In other embodiments, one or more or portions of SSE mode check module 111, large block and transform detection module 112, SAD block validation module 113, candidate disable module 114, mode selection module 115, and encode module 116 are implemented via central processor 1301 or another processing unit such as an image processor, a graphics processor, or the like.

Video processor 1302 may include any number and type of video, image, or graphics processing units that may provide the operations as discussed herein. Such operations may be implemented via software or hardware or a combination thereof. For example, video processor 1302 may include circuitry dedicated to manipulate frames, frame data, or the like obtained from memory 1303. Central processor 1301 may include any number and type of processing units or modules that may provide control and other high level functions for system 1300 and/or provide any operations as discussed herein. Memory 1303 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1303 may be implemented by cache memory.

In an embodiment, one or more or portions of SSE mode check module 111, large block and transform detection module 112, SAD block validation module 113, candidate disable module 114, mode selection module 115, and encode module 116 are implemented via an execution unit (EU). The EU may include, for example, programmable logic or circuitry such as a logic core or cores that may provide a wide array of programmable logic functions. In an embodiment, one or more or portions of SSE mode check module 111, large block and transform detection module 112, SAD block validation module 113, candidate disable module 114, mode selection module 115, and encode module 116 and translation module 112 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 12, process 1200 begins at operation 1201, where a first candidate coding structure is determined for a portion of a video frame using a first rate distortion value such that the first candidate coding structure includes a coding unit having a coding unit size, a coding mode for the coding unit, and a transform unit size for the coding unit, and such that the first rate distortion value includes a first distortion value determined by application of a first distortion measurement technique to the portion based on the first candidate coding structure. In an embodiment, the first distortion value is determined by applying a sum of squared errors technique to a residual block corresponding to the portion. For example, the residual block may be a block of pixel wise differences between the portion as predicted using the first candidate coding structure and original pixel values of the portion.

In some embodiments, determining the first candidate coding structure includes generating multiple candidate coding structures for the portion and corresponding rate distortion values based on the first distortion measurement technique and selecting the first candidate coding structure in response to the first rate distortion value being a minimum of the rate distortion values.

Processing continues at operation 1202, where, in response to the coding unit size meeting or exceeding a coding unit size threshold and the transform unit size meeting or exceeding a transform unit size threshold, a second distortion value for the portion is compared to a threshold distortion value such that the second distortion value corresponds to a second distortion measurement technique applied to the portion based on the first candidate coding structure. In an embodiment, the second distortion value is determined by applying a sum of absolute values technique to a residual block corresponding to the portion. For example, the residual block may be a block of pixel wise differences as discussed with respect to operation 1201. In an embodiment, the second distortion value is determined by applying a sum of absolute transform differences technique to a residual block corresponding to the portion. The coding unit size threshold and the transform unit size threshold may be any threshold sizes discussed herein. In an embodiment, the coding unit size threshold is a 32×32 coding unit size and the transform unit size threshold is a 16×16 transform unit size.

Processing continues at operation 1203, where the first candidate coding structure is disabled in response to the second distortion value meeting or exceeding the threshold distortion value. The first candidate coding structure is disabled using any suitable technique or techniques. In an embodiment, the first candidate coding structure is disabled by discarding the first candidate coding structure is disabled in the encode pipeline. In an embodiment, the first candidate coding structure is disabled by setting the first distortion value (or the first rate distortion value) to a high or maximum number such that the first candidate coding structure will not be subsequently selected in the encode pipeline.

Processing continues at operation 1204, where the portion of the video frame is encoded using a second candidate coding structure to generate a bitstream such that the second candidate coding structure has a second rate distortion value that is greater than the first rate distortion value. In an embodiment, the second rate distortion value includes a second distortion value determined by application of the first distortion measurement technique to the portion based on the second candidate coding structure. As discussed, application of a distortion measurement technique to a portion based on a candidate coding structure indicates the distortion measurement technique is applied to a residual block generated based on a predicted block (corresponding to the portion) as predicted using the pertinent candidate coding structure.

In an embodiment, the second candidate coding structure includes the coding unit and a second transform unit size that is smaller than the transform unit size responsive to the second distortion value exceeding the threshold distortion value. For example, a transform unit size split or a transform unit size maximum that is less than that allowed by the codec or that is at least one level smaller than the transform unit size may be implemented in response to the second distortion value exceeding the threshold distortion value. In an embodiment, the second candidate coding structure includes a second coding unit having a second coding unit size that is smaller than the coding unit size responsive to the second distortion value exceeding the threshold distortion value. For example, a coding unit size split or a coding unit size maximum that is less than that allowed by the codec or that is at least one level smaller than the coding unit size may be implemented in response to the second distortion value exceeding the threshold distortion value.

In an embodiment, the coding mode is an inter coding mode and method 1200 further includes generating, for the portion, a third candidate coding structure including a second coding unit having the coding unit size, an intra coding mode for the second coding unit, and the transform unit size for the second coding unit using a third distortion value for the third candidate coding structure that corresponds to the first distortion measurement technique applied to the portion based on the third candidate coding structure, comparing, in response to the coding unit size meeting or exceeding the coding unit size threshold and the transform unit size meeting or exceeding the transform unit size threshold for the third candidate coding structure, a fourth distortion value for the third candidate coding structure to a second threshold distortion value such that the fourth distortion value corresponds to the second distortion measurement technique applied to the portion based on the third candidate coding structure, and disabling the third candidate coding structure in response to the fourth distortion value exceeding the second threshold distortion value such that the second threshold distortion value is less than the threshold distortion value in response to the second coding unit having the intra coding mode and the coding unit having the inter coding mode.

In an embodiment, the portion consists of the coding unit (e.g., they are the same spatial region of the video frame) and method 1200 further includes generating, for the portion, a third candidate coding structure including a second coding unit having a second coding unit size less than the coding unit size, a second coding mode for the second coding unit, and a second transform unit size for the second coding unit using a third distortion value for the third candidate coding structure that corresponds to the first distortion measurement technique applied to the portion based on the third candidate coding structure, comparing, in response to the second coding unit size meeting or exceeding the coding unit size threshold and the second transform unit size meeting or exceeding the transform unit size threshold, a fourth distortion value for the third candidate coding structure to a second threshold distortion value such that the fourth distortion value corresponds to the second distortion measurement technique applied to the portion based on the third candidate coding structure, and disabling the third candidate coding structure in response to the fourth distortion value exceeding the second threshold distortion value such that the second threshold distortion value is greater than the threshold distortion value in response to the second coding unit size being less than the coding unit size.

In an embodiment, the portion consists of the coding unit (e.g., they are the same spatial region of the video frame) and method 1200 further includes generating, for the portion, a third candidate coding structure including a second coding unit having the coding unit size, a second coding mode for the second coding unit, and a second transform unit size for the second coding unit that is less than the transform unit size using a third distortion value for the third candidate coding structure that corresponds to the first distortion measurement technique applied to the portion based on the third candidate coding structure, comparing, in response to the coding unit size meeting or exceeding the coding unit size threshold and the second transform unit size meeting or exceeding the transform unit size threshold, a fourth distortion value for the third candidate coding structure to a second threshold distortion value such that the fourth distortion value corresponds to the second distortion measurement technique applied to the portion based on the third candidate coding structure, and disabling the third candidate coding structure in response to the fourth distortion value exceeding the second threshold distortion value such that the second threshold distortion value is greater than the threshold distortion value in response to the second transform unit size being less than the transform unit size. In some embodiments, process 1200 further includes generating, for the portion, a fourth candidate coding structure including a third coding unit having a second coding unit size less than the coding unit size, a third coding mode for the third coding unit, and the second transform unit size for the third coding unit using a fifth distortion value for the fourth candidate coding structure that corresponds to the first distortion measurement technique applied to the portion based on the fourth candidate coding structure, comparing, in response to the second coding unit size meeting or exceeding the coding unit size threshold and the second transform unit size meeting or exceeding the transform unit size threshold, a sixth distortion value for the fourth candidate coding structure to a third threshold distortion value such that the sixth distortion value corresponds to the second distortion measurement technique applied to the portion based on the fourth candidate coding structure, and disabling the fourth candidate coding structure in response to the sixth distortion value exceeding the third threshold distortion value such that the third threshold distortion value is greater than the second threshold distortion value in response to the second coding unit size being less than the coding unit size.

In some embodiments, process 1200 further includes generating, for the portion, the second candidate coding structure including a second coding unit having a second coding unit size, a second coding mode for the second coding unit, and a second transform unit size for the second coding unit using a third distortion value for the second candidate coding structure that corresponds to the first distortion measurement technique applied to the portion based on the second candidate coding structure and skipping, in response to the second coding unit size not meeting or exceeding the coding unit size threshold or the second transform unit size not meeting or exceeding the transform unit size threshold, comparison of a fourth distortion value for the second candidate coding structure to a second threshold distortion value.

Process 1200 may be repeated any number of times either in series or in parallel for any number of portions of a video frame, video frames, videos, pieces of video content. video segments, or the like.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 14:
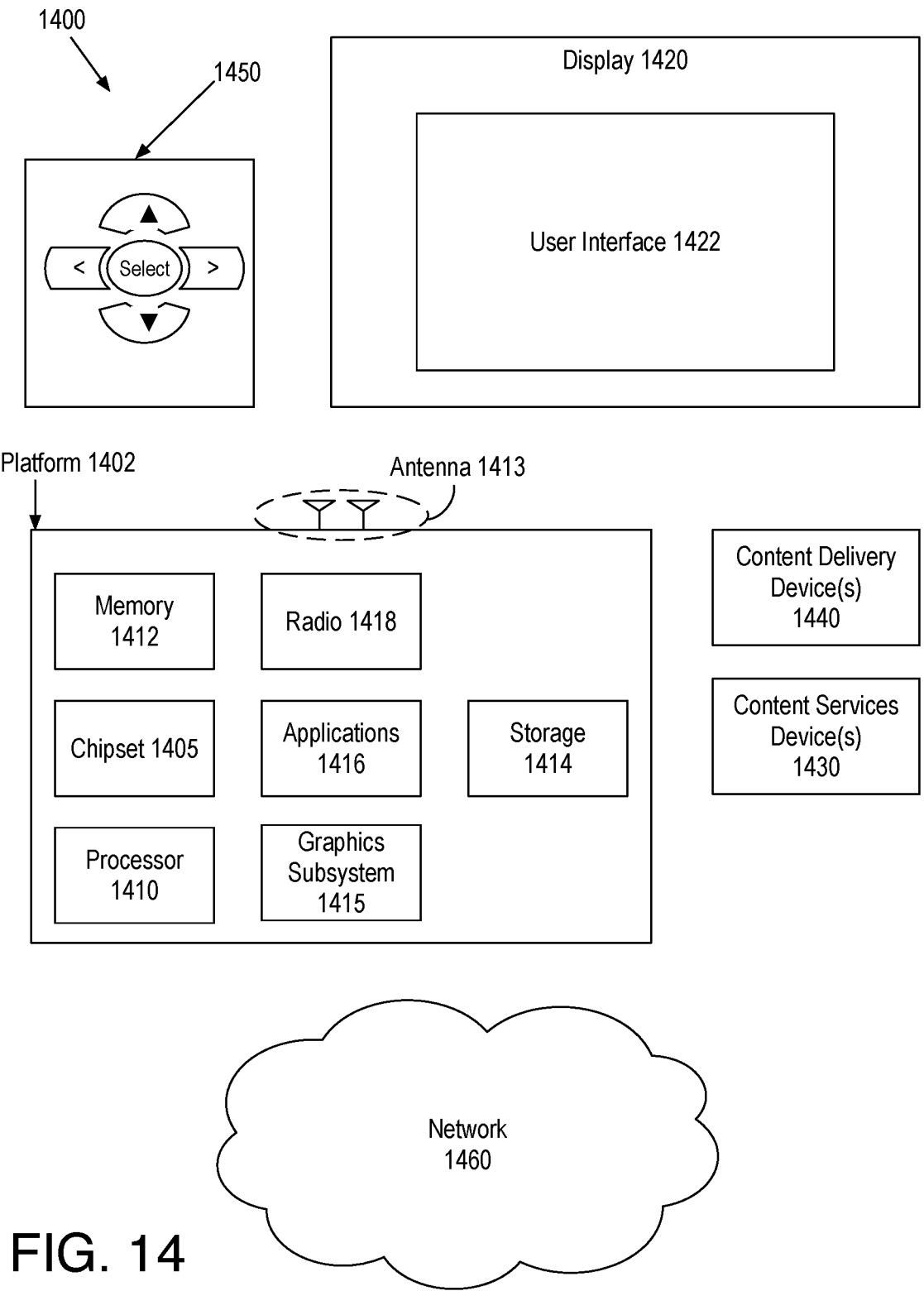
FIG. 14 is an illustrative diagram of an example system.

FIG. 14 is an illustrative diagram of an example system 1400, arranged in accordance with at least some implementations of the present disclosure. In various implementations, system 1400 may be a mobile system although system 1400 is not limited to this context. For example, system 1400 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1400 includes a platform 1402 coupled to a display 1420. Platform 1402 may receive content from a content device such as content services device(s) 1430 or content delivery device(s) 1440 or other similar content sources. A navigation controller 1450 including one or more navigation features may be used to interact with, for example, platform 1402 and/or display 1420. Each of these components is described in greater detail below.

In various implementations, platform 1402 may include any combination of a chipset 1405, processor 1410, memory 1412, antenna 1413, storage 1414, graphics subsystem 1415, applications 1416 and/or radio 1418. Chipset 1405 may provide intercommunication among processor 1410, memory 1412, storage 1414, graphics subsystem 1415, applications 1416 and/or radio 1418. For example, chipset 1405 may include a storage adapter (not depicted) capable of providing intercommunication with storage 1414.

Processor 1410 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1410 may be dual-core processor(s), dual-core mobile processor(s), and so forth.

Memory 1412 may be implemented as a volatile memory device such as, but not limited to, a Random Access Memory (RAM), Dynamic Random Access Memory (DRAM), or Static RAM (SRAM).

Storage 1414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1414 may include technology to increase the storage performance enhanced protection for valuable digital media when multiple hard drives are included, for example.

Graphics subsystem 1415 may perform processing of images such as still or video for display. Graphics subsystem 1415 may be a graphics processing unit (GPU) or a visual processing unit (VPU), for example. An analog or digital interface may be used to communicatively couple graphics subsystem 1415 and display 1420. For example, the interface may be any of a High-Definition Multimedia Interface, DisplayPort, wireless HDMI, and/or wireless HD compliant techniques. Graphics subsystem 1415 may be integrated into processor 1410 or chipset 1405. In some implementations, graphics subsystem 1415 may be a stand-alone device communicatively coupled to chipset 1405.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1418 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1418 may operate in accordance with one or more applicable standards in any version.

In various implementations, display 1420 may include any television type monitor or display. Display 1420 may include, for example, a computer display screen, touch screen display, video monitor, television-like device, and/or a television. Display 1420 may be digital and/or analog. In various implementations, display 1420 may be a holographic display. Also, display 1420 may be a transparent surface that may receive a visual projection. Such projections may convey various forms of information, images, and/or objects. For example, such projections may be a visual overlay for a mobile augmented reality (MAR) application. Under the control of one or more software applications 1416, platform 1402 may display user interface 1422 on display 1420.

In various implementations, content services device(s) 1430 may be hosted by any national, international and/or independent service and thus accessible to platform 1402 via the Internet, for example. Content services device(s) 1430 may be coupled to platform 1402 and/or to display 1420. Platform 1402 and/or content services device(s) 1430 may be coupled to a network 1460 to communicate (e.g., send and/or receive) media information to and from network 1460. Content delivery device(s) 1440 also may be coupled to platform 1402 and/or to display 1420.

In various implementations, content services device(s) 1430 may include a cable television box, personal computer, network, telephone, Internet enabled devices or appliance capable of delivering digital information and/or content, and any other similar device capable of uni-directionally or bi-directionally communicating content between content providers and platform 1402 and/display 1420, via network 1460 or directly. It will be appreciated that the content may be communicated uni-directionally and/or bi-directionally to and from any one of the components in system 1400 and a content provider via network 1460. Examples of content may include any media information including, for example, video, music, medical and gaming information, and so forth.

Content services device(s) 1430 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1402 may receive control signals from navigation controller 1450 having one or more navigation features. The navigation features of may be used to interact with user interface 1422, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 1420) by movements of a pointer, cursor, focus ring, or other visual indicators displayed on the display. For example, under the control of software applications 1416, the navigation features located on navigation may be mapped to virtual navigation features displayed on user interface 1422, for example. In various embodiments, may not be a separate component but may be integrated into platform 1402 and/or display 1420. The present disclosure, however, is not limited to the elements or in the context shown or described herein.

In various implementations, drivers (not shown) may include technology to enable users to instantly turn on and off platform 1402 like a television with the touch of a button after initial boot-up, when enabled, for example. Program logic may allow platform 1402 to stream content to media adaptors or other content services device(s) 1430 or content delivery device(s) 1440 even when the platform is turned "off." In addition, chipset 1405 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1400 may be integrated. For example, platform 1402 and content services device(s) 1430 may be integrated, or platform 1402 and content delivery device(s) 1440 may be integrated, or platform 1402, content services device(s) 1430, and content delivery device(s) 1440 may be integrated, for example. In various embodiments, platform 1402 and display 1420 may be an integrated unit. Display 1420 and content service device(s) 1430 may be integrated, or display 1420 and content delivery device(s) 1440 may be integrated, for example. These examples are not meant to limit the present disclosure.

In various embodiments, system 1400 may be implemented as a wireless system, a wired system, or a combination of both. When implemented as a wireless system, system 1400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1400 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1402 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 14.

Figure 15:
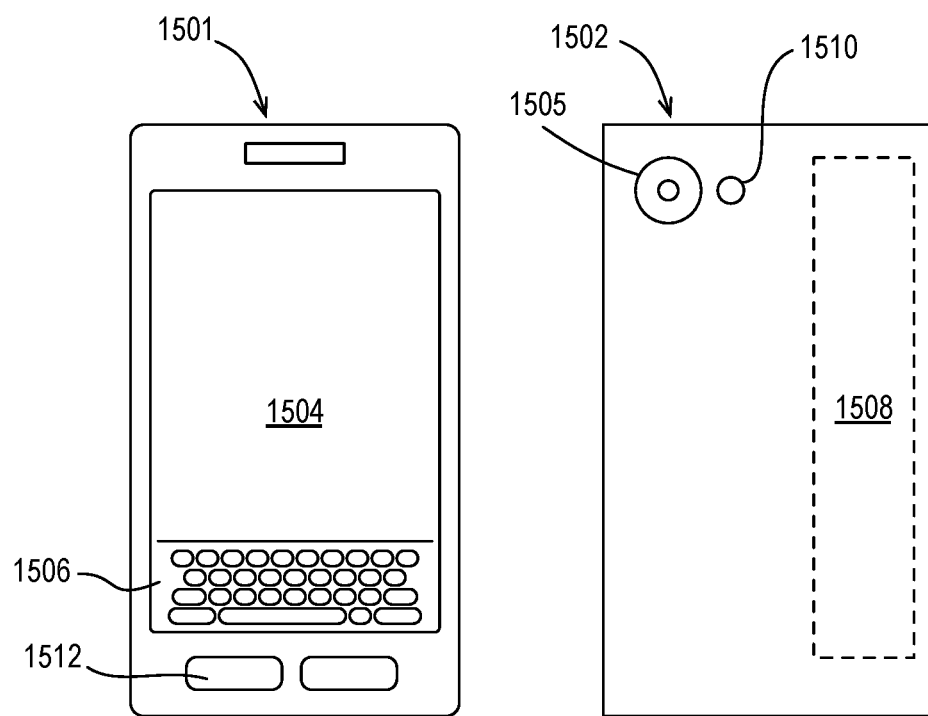
FIG. 15 illustrates an example device, all arranged in accordance with at least some implementations of the present disclosure.

As described above, system 1400 may be embodied in varying physical styles or form factors. FIG. 15 illustrates an example small form factor device 1500, arranged in accordance with at least some implementations of the present disclosure. In some examples, system 1400 may be implemented via device 1500. In other examples, system 100 or portions thereof may be implemented via device 1500. In various embodiments, for example, device 1500 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 15, device 1500 may include a housing with a front 1501 and a back 1502. Device 1500 includes a display 1504, an input/output (I/O) device 1506, and an integrated antenna 1508. Device 1500 also may include navigation features 1512. I/O device 1506 may include any suitable I/O device for entering information into a mobile computing device. Examples for I/O device 1506 may include an alphanumeric keyboard, a numeric keypad, a touch pad, input keys, buttons, switches, microphones, speakers, voice recognition device and software, and so forth. Information also may be entered into device 1500 by way of microphone (not shown), or may be digitized by a voice recognition device. As shown, device 1500 may include a camera 1505 (e.g., including a lens, an aperture, and an imaging sensor) and a flash 1510 integrated into back 1502 (or elsewhere) of device 1500. In other examples, camera 1505 and flash 1510 may be integrated into front 1501 of device 1500 or both front and back cameras may be provided. Camera 1505 and flash 1510 may be components of a camera module to originate image data processed into streaming video that is output to display 1504 and/or communicated remotely from device 1500 via antenna 1508 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for video coding comprises determining a first candidate coding structure for a portion of a video frame using a first rate distortion value, wherein the first candidate coding structure comprises a coding unit having a coding unit size, a coding mode for the coding unit, and a transform unit size for the coding unit, and wherein the first rate distortion value comprises a first distortion value determined by application of a first distortion measurement technique to the portion based on the first candidate coding structure, comparing, in response to the coding unit size meeting or exceeding a coding unit size threshold and the transform unit size meeting or exceeding a transform unit size threshold, a second distortion value to a threshold distortion value, wherein the second distortion value corresponds to a second distortion measurement technique applied to the portion based on the first candidate coding structure, disabling the first candidate coding structure in response to the second distortion value meeting or exceeding the threshold distortion value, and encoding the portion using a second candidate coding structure to generate a bitstream, wherein the second candidate coding structure has a second rate distortion value that is greater than the first rate distortion value.

In one or more second embodiments, further to the first embodiments, the first distortion measurement technique comprises a sum of squared errors applied to a residual block corresponding to the portion and the second distortion measurement technique comprises one of a sum of absolute differences or a sum of absolute transform differences applied to the residual block.

In one or more third embodiments, further to the first or second embodiments, the coding unit size threshold comprises a 32×32 coding unit size and the transform unit size threshold comprises a 16×16 transform unit size.

In one or more fourth embodiments, further to any of the first through third embodiments, the second candidate coding structure comprises the coding unit and a second transform unit size that is smaller than the transform unit size responsive to the second distortion value exceeding the threshold distortion value.

In one or more fifth embodiments, further to any of the first through fourth embodiments, the second candidate coding structure comprises a second coding unit having a second coding unit size that is smaller than the coding unit size responsive to the second distortion value exceeding the threshold distortion value.

In one or more sixth embodiments, further to any of the first through fifth embodiments, determining the first candidate coding structure comprises generating a plurality of candidate coding structures for the portion and a corresponding plurality of rate distortion values based on the first distortion measurement technique and selecting the first candidate coding structure in response to the first rate distortion value being a minimum of the plurality of rate distortion values.

In one or more seventh embodiments, further to any of the first through sixth embodiments, the coding mode comprises an inter coding mode and the method further comprises generating, for the portion, a third candidate coding structure comprising a second coding unit having the coding unit size, an intra coding mode for the second coding unit, and the transform unit size for the second coding unit using a third distortion value for the third candidate coding structure that corresponds to the first distortion measurement technique applied to the portion based on the third candidate coding structure, comparing, in response to the coding unit size meeting or exceeding the coding unit size threshold and the transform unit size meeting or exceeding the transform unit size threshold for the third candidate coding structure, a fourth distortion value for the third candidate coding structure to a second threshold distortion value, wherein the fourth distortion value corresponds to the second distortion measurement technique applied to the portion based on the third candidate coding structure, and disabling the third candidate coding structure in response to the fourth distortion value exceeding the second threshold distortion value, wherein the second threshold distortion value is less than the threshold distortion value in response to the second coding unit having the intra coding mode and the coding unit having the inter coding mode.

In one or more eighth embodiments, further to any of the first through seventh embodiments, the portion consists of the coding unit and the method further comprises generating, for the portion, a third candidate coding structure comprising a second coding unit having a second coding unit size less than the coding unit size, a second coding mode for the second coding unit, and a second transform unit size for the second coding unit using a third distortion value for the third candidate coding structure that corresponds to the first distortion measurement technique applied to the portion based on the third candidate coding structure, comparing, in response to the second coding unit size meeting or exceeding the coding unit size threshold and the second transform unit size meeting or exceeding the transform unit size threshold, a fourth distortion value for the third candidate coding structure to a second threshold distortion value, wherein the fourth distortion value corresponds to the second distortion measurement technique applied to the portion based on the third candidate coding structure, and disabling the third candidate coding structure in response to the fourth distortion value exceeding the second threshold distortion value, wherein the second threshold distortion value is greater than the threshold distortion value in response to the second coding unit size being less than the coding unit size.

In one or more ninth embodiments, further to any of the first through eighth embodiments, the portion consists of the coding unit and the method further comprises generating, for the portion, a third candidate coding structure comprising a second coding unit having the coding unit size, a second coding mode for the second coding unit, and a second transform unit size for the second coding unit that is less than the transform unit size using a third distortion value for the third candidate coding structure that corresponds to the first distortion measurement technique applied to the portion based on the third candidate coding structure, comparing, in response to the coding unit size meeting or exceeding the coding unit size threshold and the second transform unit size meeting or exceeding the transform unit size threshold, a fourth distortion value for the third candidate coding structure to a second threshold distortion value, wherein the fourth distortion value corresponds to the second distortion measurement technique applied to the portion based on the third candidate coding structure, and disabling the third candidate coding structure in response to the fourth distortion value exceeding the second threshold distortion value, wherein the second threshold distortion value is greater than the threshold distortion value in response to the second transform unit size being less than the transform unit size.

In one or more tenth embodiments, further to any of the first through ninth embodiments, the method further comprises generating, for the portion, a fourth candidate coding structure comprising a third coding unit having a second coding unit size less than the coding unit size, a third coding mode for the third coding unit, and the second transform unit size for the third coding unit using a fifth distortion value for the fourth candidate coding structure that corresponds to the first distortion measurement technique applied to the portion based on the fourth candidate coding structure, comparing, in response to the second coding unit size meeting or exceeding the coding unit size threshold and the second transform unit size meeting or exceeding the transform unit size threshold, a sixth distortion value for the fourth candidate coding structure to a third threshold distortion value, wherein the sixth distortion value corresponds to the second distortion measurement technique applied to the portion based on the fourth candidate coding structure, and disabling the fourth candidate coding structure in response to the sixth distortion value exceeding the third threshold distortion value, wherein the third threshold distortion value is greater than the second threshold distortion value in response to the second coding unit size being less than the coding unit size.

In one or more eleventh embodiments, further to any of the first through tenth embodiments, the method further comprises generating, for the portion, the second candidate coding structure comprising a second coding unit having a second coding unit size, a second coding mode for the second coding unit, and a second transform unit size for the second coding unit using a third distortion value for the second candidate coding structure that corresponds to the first distortion measurement technique applied to the portion based on the second candidate coding structure and skipping, in response to the second coding unit size not meeting or exceeding the coding unit size threshold or the second transform unit size not meeting or exceeding the transform unit size threshold, comparison of a fourth distortion value for the second candidate coding structure to a second threshold distortion value.

In one or more twelfth embodiments, a device or system includes a memory and a processor to perform a method according to any one of the above embodiments.

In one or more thirteenth embodiments, at least one machine readable medium includes a plurality of instructions that in response to being executed on a computing device, cause the computing device to perform a method according to any one of the above embodiments.

In one or more fourteenth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A device for video coding comprising:
    a memory to store a video; and
    a processor coupled to the memory, the processor to:
        determine a first candidate coding structure for a portion of a video frame from a plurality of candidate coding structures based on a first rate distortion value corresponding to the first candidate coding structure being a minimum rate distortion value of a plurality of rate distortion values each corresponding to one of the plurality of candidate coding structures, wherein the first candidate coding structure comprises a coding unit having a coding unit size, a coding mode for the coding unit, and a transform unit size for the coding unit, and wherein each of the plurality of rate distortion values comprises a distortion value determined by application of a first distortion measurement technique to the portion, including a first distortion value corresponding to the first candidate coding structure;
        compare, in response to the coding unit size meeting or exceeding a coding unit size threshold and the transform unit size meeting or exceeding a transform unit size threshold, a second distortion value to a threshold distortion value, wherein the second distortion value corresponds to a second distortion measurement technique applied to the portion based on the first candidate coding structure;
        disable the first candidate coding structure in response to the second distortion value exceeding the threshold distortion value; and encode the portion using a second candidate coding structure to generate a bitstream, wherein the second candidate coding structure has a second rate distortion value that is greater than the first rate distortion value.

2. The device of claim 1, wherein the first distortion measurement technique comprises a sum of squared errors applied to a residual block corresponding to the portion and the second distortion measurement technique comprises one of a sum of absolute differences or a sum of absolute transform differences applied to the residual block.

3. The device of claim 1, wherein the coding unit size threshold comprises a 32×32 coding unit size and the transform unit size threshold comprises a 16×16 transform unit size.

4. The device of claim 1, wherein the second candidate coding structure comprises the coding unit and a second transform unit size that is smaller than the transform unit size responsive to the second distortion value exceeding the threshold distortion value.

5. The device of claim 1, wherein the second candidate coding structure comprises a second coding unit having a second coding unit size that is smaller than the coding unit size responsive to the second distortion value exceeding the threshold distortion value.

6. The device of claim 1, wherein the processor to determine the first candidate coding structure comprises the processor to:
generate a plurality of candidate coding structures for the portion and a corresponding plurality of rate distortion values based on the first distortion measurement technique; and
select the first candidate coding structure in response to the first rate distortion value being a minimum of the plurality of rate distortion values.

7. The device of claim 1, wherein the coding mode comprises an inter coding mode and the processor is further to:
generate, for the portion, a third candidate coding structure comprising a second coding unit having the coding unit size, an intra coding mode for the second coding unit, and the transform unit size for the second coding unit using a third distortion value for the third candidate coding structure that corresponds to the first distortion measurement technique applied to the portion based on the third candidate coding structure;
compare, in response to the coding unit size meeting or exceeding the coding unit size threshold and the transform unit size meeting or exceeding the transform unit size threshold for the third candidate coding structure, a fourth distortion value for the third candidate coding structure to a second threshold distortion value, wherein the fourth distortion value corresponds to the second distortion measurement technique applied to the portion based on the third candidate coding structure; and
disable the third candidate coding structure in response to the fourth distortion value exceeding the second threshold distortion value, wherein the second threshold distortion value is less than the threshold distortion value in response to the second coding unit having the intra coding mode and the coding unit having the inter coding mode.

8. The device of claim 1, wherein the portion consists of the coding unit and the processor is further to:
generate, for the portion, a third candidate coding structure comprising a second coding unit having a second coding unit size less than the coding unit size, a second coding mode for the second coding unit, and a second transform unit size for the second coding unit using a third distortion value for the third candidate coding structure that corresponds to the first distortion measurement technique applied to the portion based on the third candidate coding structure;
compare, in response to the second coding unit size meeting or exceeding the coding unit size threshold and the second transform unit size meeting or exceeding the transform unit size threshold, a fourth distortion value for the third candidate coding structure to a second threshold distortion value, wherein the fourth distortion value corresponds to the second distortion measurement technique applied to the portion based on the third candidate coding structure; and
disable the third candidate coding structure in response to the fourth distortion value exceeding the second threshold distortion value, wherein the second threshold distortion value is greater than the threshold distortion value in response to the second coding unit size being less than the coding unit size.

9. The device of claim 1, wherein the portion consists of the coding unit and the processor is further to:
generate, for the portion, a third candidate coding structure comprising a second coding unit having the coding unit size, a second coding mode for the second coding unit, and a second transform unit size for the second coding unit that is less than the transform unit size using a third distortion value for the third candidate coding structure that corresponds to the first distortion measurement technique applied to the portion based on the third candidate coding structure;
compare, in response to the coding unit size meeting or exceeding the coding unit size threshold and the second transform unit size meeting or exceeding the transform unit size threshold, a fourth distortion value for the third candidate coding structure to a second threshold distortion value, wherein the fourth distortion value corresponds to the second distortion measurement technique applied to the portion based on the third candidate coding structure; and
disable the third candidate coding structure in response to the fourth distortion value exceeding the second threshold distortion value, wherein the second threshold distortion value is greater than the threshold distortion value in response to the second transform unit size being less than the transform unit size.

10. The device of claim 9, the processor further to:
generate, for the portion, a fourth candidate coding structure comprising a third coding unit having a second coding unit size less than the coding unit size, a third coding mode for the third coding unit, and the second transform unit size for the third coding unit using a fifth distortion value for the fourth candidate coding structure that corresponds to the first distortion measurement technique applied to the portion based on the fourth candidate coding structure;
compare, in response to the second coding unit size meeting or exceeding the coding unit size threshold and the second transform unit size meeting or exceeding the transform unit size threshold, a sixth distortion value for the fourth candidate coding structure to a third threshold distortion value, wherein the sixth distortion value corresponds to the second distortion measurement technique applied to the portion based on the fourth candidate coding structure; and disable the fourth candidate coding structure in response to the sixth distortion value exceeding the third threshold distortion value, wherein the third threshold distortion value is greater than the second threshold distortion value in response to the second coding unit size being less than the coding unit size.

11. The device of claim 1, the processor further to:
generate, for the portion, the second candidate coding structure comprising a second coding unit having a second coding unit size, a second coding mode for the second coding unit, and a second transform unit size for the second coding unit using a third distortion value for the second candidate coding structure that corresponds to the first distortion measurement technique applied to the portion based on the second candidate coding structure; and
skip, in response to the second coding unit size not meeting or exceeding the coding unit size threshold or the second transform unit size not meeting or exceeding the transform unit size threshold, comparison of a fourth distortion value for the second candidate coding structure to a second threshold distortion value.

12. A method for video coding comprising:
determining a first candidate coding structure for a portion of a video frame from a plurality of candidate coding structures based on a first rate distortion value corresponding to the first candidate coding structure being a minimum rate distortion value of a plurality of rate distortion values each corresponding to one of the plurality of candidate coding structures, wherein the first candidate coding structure comprises a coding unit having a coding unit size, a coding mode for the coding unit, and a transform unit size for the coding unit, and wherein each of the plurality of rate distortion values comprises a distortion value determined by application of a first distortion measurement technique to the portion, including a first distortion value corresponding to the first candidate coding structure;
comparing, in response to the coding unit size meeting or exceeding a coding unit size threshold and the transform unit size meeting or exceeding a transform unit size threshold, a second distortion value to a threshold distortion value, wherein the second distortion value corresponds to a second distortion measurement technique applied to the portion based on the first candidate coding structure;
disabling the first candidate coding structure in response to the second distortion value exceeding the threshold distortion value; and
encoding the portion using a second candidate coding structure to generate a bitstream, wherein the second candidate coding structure has a second rate distortion value that is greater than the first rate distortion value.

13. The method of claim 12, wherein the first distortion measurement technique comprises a sum of squared errors applied to a residual block corresponding to the portion and the second distortion measurement technique comprises one of a sum of absolute differences or a sum of absolute transform differences applied to the residual block.

14. The method of claim 12, wherein the second candidate coding structure comprises the coding unit and a second transform unit size that is smaller than the transform unit size responsive to the second distortion value exceeding the threshold distortion value.

15. The method of claim 12, wherein the second candidate coding structure comprises a second coding unit having a second coding unit size that is smaller than the coding unit size responsive to the second distortion value exceeding the threshold distortion value.

16. The method of claim 12, wherein the coding mode comprises an inter coding mode, the method further comprising:
generating, for the portion, a third candidate coding structure comprising a second coding unit having the coding unit size, an intra coding mode for the second coding unit, and the transform unit size for the second coding unit using a third distortion value for the third candidate coding structure that corresponds to the first distortion measurement technique applied to the portion based on the third candidate coding structure;
comparing, in response to the coding unit size meeting or exceeding the coding unit size threshold and the transform unit size meeting or exceeding the transform unit size threshold for the third candidate coding structure, a fourth distortion value for the third candidate coding structure to a second threshold distortion value, wherein the fourth distortion value corresponds to the second distortion measurement technique applied to the portion based on the third candidate coding structure; and
disabling the third candidate coding structure in response to the fourth distortion value exceeding the second threshold distortion value, wherein the second threshold distortion value is less than the threshold distortion value in response to the second coding unit having the intra coding mode and the coding unit having the inter coding mode.

17. At least one non-transitory machine readable medium comprising a plurality of instructions that, in response to being executed on a computing device, cause the computing device to encode video by:
determining a first candidate coding structure for a portion of a video frame from a plurality of candidate coding structures based on a first rate distortion value corresponding to the first candidate coding structure being a minimum rate distortion value of a plurality of rate distortion values each corresponding to one of the plurality of candidate coding structures, wherein the first candidate coding structure comprises a coding unit having a coding unit size, a coding mode for the coding unit, and a transform unit size for the coding unit, and wherein each of the plurality of rate distortion values comprises a distortion value determined by application of a first distortion measurement technique to the portion, including a first distortion value corresponding to the first candidate coding structure;
comparing, in response to the coding unit size meeting or exceeding a coding unit size threshold and the transform unit size meeting or exceeding a transform unit size threshold, a second distortion value to a threshold distortion value, wherein the second distortion value corresponds to a second distortion measurement technique applied to the portion based on the first candidate coding structure;
disabling the first candidate coding structure in response to the second distortion value exceeding the threshold distortion value; and
encoding the portion using a second candidate coding structure to generate a bitstream, wherein the second candidate coding structure has a second rate distortion value that is greater than the first rate distortion value.

18. The non-transitory machine readable medium of claim 17, wherein the first distortion measurement technique comprises a sum of squared errors applied to a residual block corresponding to the portion and the second distortion measurement technique comprises one of a sum of absolute differences or a sum of absolute transform differences applied to the residual block.

19. The non-transitory machine readable medium of claim 17, wherein the second candidate coding structure comprises the coding unit and a second transform unit size that is smaller than the transform unit size responsive to the second distortion value exceeding the threshold distortion value.

20. The non-transitory machine readable medium of claim 17, wherein the second candidate coding structure comprises a second coding unit having a second coding unit size that is smaller than the coding unit size responsive to the second distortion value exceeding the threshold distortion value.

* * * * *